US010846700B2

United States Patent
Cairns et al.

(10) Patent No.: US 10,846,700 B2
(45) Date of Patent: Nov. 24, 2020

(54) PROXY DEVICE FOR REPRESENTING MULTIPLE CREDENTIALS

(71) Applicant: VERRENCY HOLDINGS LIMITED, Singapore (SG)

(72) Inventors: Geoffrey Ian Cairns, Redmond, WA (US); Kenneth Mages, Chicago, IL (US); Jan Drake, Seattle, WA (US); Daniel J. MacDonald, Seattle, WA (US); Scott Charles Baisch, Sammamish, WA (US); Alex Benjamin Engelberg, Everett, WA (US); Paul Murray, Redmond, WA (US); Alan J. Morgan, Chicago, IL (US)

(73) Assignee: VERRENCY HOLDINGS LIMITED, Singapore (SG)

( * ) Notice: Subject to any disclaimer, the term of this patent is extended or adjusted under 35 U.S.C. 154(b) by 125 days.

(21) Appl. No.: 15/245,519

(22) Filed: Aug. 24, 2016

(65) Prior Publication Data

US 2017/0076291 A1 Mar. 16, 2017

Related U.S. Application Data

(60) Provisional application No. 62/283,769, filed on Sep. 10, 2015.

(51) Int. Cl.
*G06Q 20/40* (2012.01)
*G06Q 20/34* (2012.01)
(Continued)

(52) U.S. Cl.
CPC ... *G06Q 20/4016* (2013.01); *G06K 19/07722* (2013.01); *G06Q 20/02* (2013.01);
(Continued)

(58) Field of Classification Search
CPC ........ G06Q 20/34; G06Q 20/06; G06Q 20/10; G06Q 20/32; G06Q 20/40; G06Q 20/20;
(Continued)

(56) References Cited

U.S. PATENT DOCUMENTS 7,922,082 B2 4/2011 Muscato
8,615,468 B2 12/2013 Varadarajan
(Continued)

OTHER PUBLICATIONS

Search Report and Written Opinion dated Jan. 3, 2017 issued for International PCT Application No. PCT/IB2016/001395 filed Aug. 24, 2016.

*Primary Examiner* — Olusegun Goyea
(74) *Attorney, Agent, or Firm* — K&L Gates LLP

(57) ABSTRACT

Payment devices and the systems and methods for securely managing financial transactions using the payment devices are provided. In one implementation, a portable proxy device comprises a memory configured to store a plurality of credentials. Each of the plurality of credentials pertains to one of a financial credential, an identification credential, or contractual credential. The portable proxy device also includes at least one interface, wherein each of the at least one interface is configured to communicate one of the plurality of credentials to an external device to complete one of a financial function, identification function, or contractual function.

17 Claims, 13 Drawing Sheets

(51) Int. Cl.
*G06Q 20/38* (2012.01)
*G06Q 20/36* (2012.01)
*G06Q 20/32* (2012.01)
*G06Q 20/02* (2012.01)
*G06Q 20/20* (2012.01)
*G06K 19/077* (2006.01)
*G06Q 20/10* (2012.01)

(52) U.S. Cl.
CPC ......... *G06Q 20/102* (2013.01); *G06Q 20/202* (2013.01); *G06Q 20/204* (2013.01); *G06Q 20/206* (2013.01); *G06Q 20/3224* (2013.01); *G06Q 20/3278* (2013.01); *G06Q 20/341* (2013.01); *G06Q 20/352* (2013.01); *G06Q 20/363* (2013.01); *G06Q 20/385* (2013.01); *G06Q 20/38215* (2013.01); *G06Q 20/405* (2013.01)

(58) Field of Classification Search
CPC ........ G06Q 30/00; G06Q 20/38; G06Q 20/36; H04B 1/38
USPC ......... 705/41, 21, 66, 67, 26.1, 40; 455/558; 713/183, 171
See application file for complete search history.

(56) References Cited

U.S. PATENT DOCUMENTS

| | | |
|---|---|---|
| 8,919,643 B2 | 12/2014 | Ashfield |
| 2009/0143104 A1* | 6/2009 | Loh ...................... G06Q 20/352 455/558 |
| 2010/0228640 A1* | 9/2010 | Anderson ............. H04L 9/3271 705/26.1 |
| 2011/0307710 A1* | 12/2011 | McGuire ................ H04L 29/06 713/183 |
| 2012/0153028 A1 | 6/2012 | Poznansky |
| 2012/0203700 A1* | 8/2012 | Ornce ................ G06Q 20/3278 705/67 |
| 2014/0006277 A1 | 1/2014 | Rao |
| 2014/0279474 A1* | 9/2014 | Evans ................... G06Q 20/40 705/41 |
| 2015/0081462 A1* | 3/2015 | Ozvat ................... G06Q 20/40 705/21 |
| 2015/0254650 A1* | 9/2015 | Bondesen .......... G06Q 20/3674 705/67 |
| 2016/0086169 A1* | 3/2016 | Jodoin ................ G06Q 20/385 705/66 |
| 2016/0239813 A1* | 8/2016 | Ko ..................... G06Q 20/0655 |
| 2016/0321652 A1* | 11/2016 | Dimmick ............. G06Q 20/401 |

* cited by examiner

PROXY DEVICE FOR REPRESENTING MULTIPLE CREDENTIALS

CROSS-REFERENCE TO RELATED APPLICATIONS

This application claims the benefit of U.S. Provisional Application No. 62/283,769 filed Sep. 10, 2015, the entire disclosure of which is incorporated by reference herein.

FIELD OF THE INVENTION

The present disclosure generally relates to financial services, and more particularly relates to payment devices and systems for settling financial transactions.

BACKGROUND

Plastic payment cards, such as credit cards, were introduced in the United States in the late 1940s as a way for a bank's most trusted customers to pay for meals and travel without carrying large amounts of cash. Since then, billions of payment cards have been issued by tens of thousands of banks.

However, several types of illegal activities pose a threat to the security of conventional payment card systems. Identity theft, counterfeit activities, fraud, unauthorized account access, and other illegal activity compromise the integrity of the system. Conventional payment cards, and the networks used to authorize and settle card transactions, are vulnerable to widespread exploits by identity thieves and other criminals. One major form of payment account fraud is the unauthorized use of payment account details when conducting electronic commerce. Another major form of payment account fraud is the production and use of counterfeit cards at a merchant's point-of-sale (POS) device. These forms of fraud are inherent by the way that the payment cards themselves are produced. Specifically, credit card numbers and other payment account details, which are printed or embossed on a conventional plastic payment card, can easily be copied or stolen. Also, a payment card's magnetic stripe can be counterfeited. In fact, losses to banks, merchants, and consumers caused by payment card fraud is on a rapid rise. Payment card fraud costs the industry close to $20 billion annually.

To combat counterfeit and misappropriation fraud, which is the source of the majority of the financial risk to banks and payment brands, the major card issuing networks have adopted new technologies to ensure only legitimate cards are used at physical points of sale. These technologies, developed by the payment card industry and a consortium of card issuing networks (EMVCo), adds to the plastic card a tamper-resistant computer microchip with confidential storage and computing capability. EMVCo is a payment industry consortium named for EuroPay, MasterCard, and Visa, which are the original founders of the organization, but now also includes American Express, Discover, JCB, and Union Pay as equity partners.

This microchip confidentially stores the information and programs needed to generate a unique cryptographic signature at the time a transaction is made at a merchant POS. Computing processes are performed securely and confidentially inside the embedded microchip at the time of each transaction and the result is passed along with the payment account data through the existing payment network to the card issuing bank where it is verified using the same information stored in the card. The stored information is never disclosed by the issuing institution and cannot be extracted from the microchip by any practical means. The microchip-embedded card thus provides a one-time code for each card transaction performed at a physical point of sale. If all merchants honor this new mechanism, the risk that a counterfeit card could be produced by misappropriation of account data is largely eliminated.

Another way that issuing institutions attempt to combat fraud is by providing cards having near field communication (NFC) components. Cards that are enabled with NFC components allow a user to tap or pass the card near an NFC reader to within about 10 cm.

However, the microchip-embedded cards, also known as EMV cards or smart cards, and NFC-enabled cards must also work in environments that have not yet embraced the new standards. Many merchants have yet to adopt the EMV-enabled terminals that can activate the microchip cards and read the cryptographic code or the NFC readers that can read the wireless communication signals. To ensure payment cards are universally accepted, the issuing institutions include a conventional magnetic stripe on the back of the card.

Additionally, to enable electronic and telephone commerce, issuing institutions include the payment account number either printed on the card and/or embossed into the plastic. Therefore, not only can the microchip and NFC components be used in making financial transactions, but also the magnetic stripe can be used in a financial transaction using a POS swiping process or the account numbers can be used in telephone or Internet transaction. The method by which the card communicates the account information to the merchant terminal is known as the mode. In other words, the microchip card can be utilized in at least four different modes of financial transactions, including, for example, magnetic stripe swiping mode, various modes using the EMV chip, NFC mode, and manual card number entry. The microchip may also enable additional modes, which is one reason why there may be more than four different modes of financial transactions.

A thief who encounters one of these new EMV or NFC payment cards and has physical control of the card even for a few brief moments can easily steal the sensitive payment account data without considering the embedded chip or NFC components. This can be done by reading the payment data from the magnetic stripe, in order to prepare a counterfeit card. The thief can also steal the data by taking a picture of the card and capturing the card numbers for fraudulent electronic commerce. It should be noted that both the magnetic stripe data and the printed data are not protected by digital security means like cryptography. The compromised data may then be used at less secure retail merchants, who have not yet adopted the EMV system, or the thief may go online to perform electronic commerce transactions.

Therefore, a need exists for more secure payment cards. To combat the above-mentioned problems, and to improve customer satisfaction and control of the payment card experience, the present invention introduces several innovative elements for payment cards and financial networks and the authorization and settlement of financial transactions.

SUMMARY

The present disclosure describes payment devices and related systems and methods for securely managing financial transactions using the payment devices. A payment device may take such forms as, for example, a portable proxy device, a plastic payment card, a virtual card, a wearable commerce device, one or more components embedded in a mobile device, an application running on mobile devices or computers, and other payment credential forms. According to one implementation, a portable proxy device comprises a memory configured to store a plurality of credentials. Each of the plurality of credentials pertains to one of a financial credential, an identification credential, or contractual credential. The portable proxy device also includes at least one interface, wherein each of the at least one interface is configured to communicate one of the plurality of credentials to an external device to complete one of a financial function, identification function, or contractual function.

According to another implementation, a system comprises a point-of-sale (POS) device configured to obtain at least one credential from a mobile proxy device, each of the at least one credential pertaining to one of a financial credential, an identification credential, or contractual credential. The system also includes a payment processor configured to receive the at least one credential obtained from the mobile proxy device and perform at least one of a financial function, identification function, or contractual function.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure and are not necessarily drawn to scale. Corresponding features and components throughout the figures may be designated by matching reference characters for the sake of consistency and clarity.

DETAILED DESCRIPTION

Figure 1:
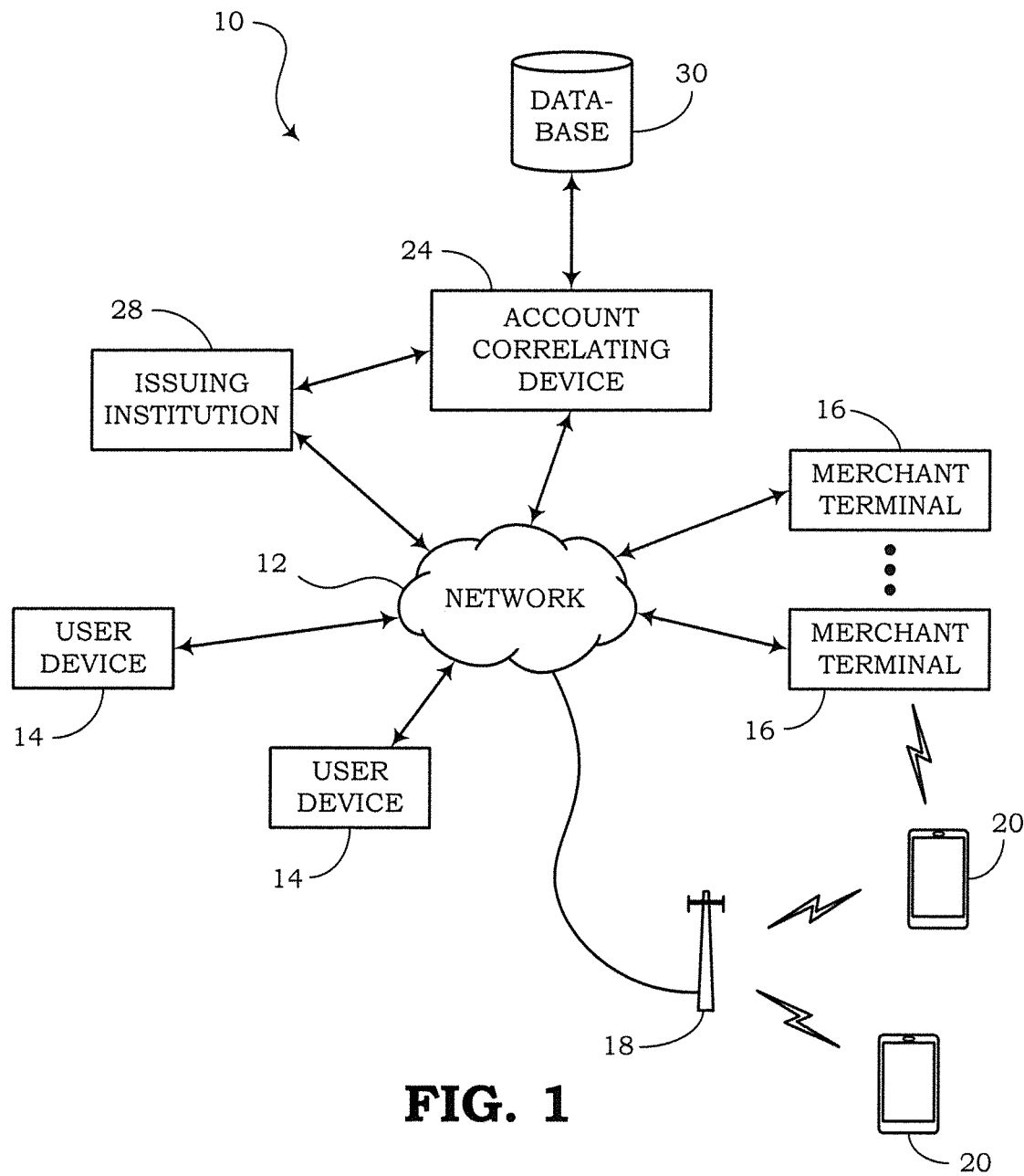
FIG. 1 is a block diagram illustrating a payment system according to various implementations of the present disclosure.

The present invention is directed to payment devices, such as, for example, plastic payment cards, virtual cards, wearable commerce devices, components embedded in mobile devices, applications running on mobile devices or computers, and other payment credentials. The present invention is also directed to systems and methods for conducting financial transactions using the payment devices. The present invention may include a commercially viable computing service, mobile application, and web site and may be implemented in conjunction with an issuing institution using payment cards or other payment devices as described herein. The present invention introduces several novel elements that can be employed by existing device and valid credential issuing institutions to combat various forms of fraud. The term "valid credential" is used in this document to represent a valid funding instrument, which may be, but is not limited to, a credit card, charge card, direct deposit account, savings account, checking account, loyalty card, gift card, or other cards or devices.

The present invention includes multimodal payment devices, which can be used in various modes for different types of financial transactions. For example, payments devices described herein may include multiple modes for completing a transaction. Some modes may include those involving a microchip embedded in the device, those involving near field communication (NFC) components, those involving the magnetic stripe, those involving entering the device number and card verification value (CVV) in an online transaction, and/or other modes. The present invention includes novel fraud-reducing features, a mobile phone application, and a companion web site to control the novel fraud-reducing features. Also, a computing service can be used in the authorization and settlement networks serving both online and retail merchants.

Current issuing practice for payment devices is to include the user's single primary account number (PAN) details, which correspond directly to the user's actual valid credential, across all the various modes of the payment device (i.e., including magnetic stripe, EMV chip, NFC, etc.). However, by using a substitute account number, or token, in place of a primary account number (PAN), as is described in the present disclosure, an account correlating device can be interposed between the merchant and the issuing bank to supplement the security of transactions, or called by the issuing bank as part of processing the payment. The payment device systems described herein substitute user PAN details securely, in the network, prior to transaction authorization and settlement. In this way, disclosure of the user's PAN details to the merchant is prevented.

The present invention uses several distinct, anonymous, and unpredictable sets of substitute account details for each payment device and/or for each mode of each payment device. In the example of physical payment cards, one set of substitute account details may be associated with one or more modes of the EMV chip, another set may be associated with another mode of the EMV chip, another set of substitute account details may be associated with the NFC components, another set for the magnetic stripe, and another for use during electronic commerce, and yet another for manual entry. Using several distinct sets of substitute account details can prevent cross-mode payment fraud.

Current practice is to include the same PAN in the EMV chip that is included in the magnetic stripe and that is printed on the device. Financial transactions can then be accepted when any of the multiple modes is presented, which makes cross-modal fraud possible. For example, a thief might intercept the EMV device details and produce a counterfeit magnetic stripe device. Also, a thief might take both EMV and magnetic stripe account details, using device data readers, and perform unauthorized electronic commerce transactions. However, the present invention is not limited by the same PAN being used for all modes. Instead, the present invention uses multiple distinct sets of substitute account details corresponding to multiple valid credentials, where each substitute account can be associated with a distinct mode. In this way, cross-modal payment fraud can be prevented.

It should be noted that the payment devices described in the present disclosure may be implemented as credit cards, debit cards, virtual cards, wearable devices, Internet of things (IoT) devices, components and/or application embedded in mobile devices, and/or other financial credentials. In other embodiments, the payment devices described in the present disclosure may apply to non-payment devices that are used in other environments besides commerce. For example, non-payment devices (e.g., loyalty cards, mobile devices, and other non-financial credentials) may apply to other functions for standing in as a proxy credential to electronically authenticate identification, such as for health insurance purposes, driver's license purposes, etc., to gain access to a secure location, to provide a photographic identification of the user, and for other purposes. Further, the valid credentials that may be associated with substitute account details may be payment and/or non-payment credentials, such as loyalty credentials, health insurance credentials, and other financial or non-financial credentials.

FIG. 1 is a block diagram illustrating an embodiment of a payment system 10 in which an issuing institution 28 issues a payment device, such as a credit card or debit card, to a user. In other embodiments, the user may use another type of proxy credential other than a payment card, such as a mobile device. According to the embodiment of FIG. 1, the payment system 10 includes a public network 12, one or more user devices 14, one or more merchant terminals 16, one or more wireless communication antennas 18, one or more mobile devices 20, and an account correlating device 24.

The term "merchant terminal" is used to describe a physical terminal, website, or other devices for providing functionality by a merchant at which a payment is originated. Merchant terminals can be embedded in POS equipment and can be "virtual" as in ecommerce website processing. Also, merchant terminals can be background devices where no device, card, customer, merchant, or goods are involved, such as when recurring payments are initiated for services. The "merchant terminal" may represent POS devices, merchant online systems, and other mechanisms owned/controlled by the merchant to conduct various modes of purchase. The merchant terminals may include any merchant systems used in different payment modes using one or more types of technologies (e.g., EMV chip, magnetic stripe, NFC, e-commerce, etc.).

The network 12 may include a wide area network, the Internet, private networks, and/or other publicly accessible networks. Also, the network 12 may include local area networks associated with various merchants. The network 12 may also be in communication with one or more cellular networks connected to the antennas 18.

The user devices 14, merchant terminals 16, and antennas 18 may be connected by one or more wired or wireless connections to the network 12 to enable electronic communication among the various components. The wireless communication antennas 18 may include one or more cellular towers, orbiting satellites, or other wireless communication hubs for communication with the mobile devices 20.

The account correlating device 24 could be a server, a web server, software running on a server, a hardware appliance, or any suitable intermediary computing device for providing various transaction services. The account correlating device 24 is also connected to a network 26, which is also connected via wired or wireless connections to one or more issuing institutions 28 and one or more databases 30. The network 26 may be a private network, local area network, a virtual private network (VPN), or a public network with a high level of encryption. The account correlating device 24 may be configured to store information in the database 30 that directs one or several substitute accounts to an authentic account owned by a user or customer of the issuing institution 28.

During a purchasing operation, the user to whom a payment device has been issued may use the payment device as payment for merchandise or services. The payment device can be presented to a merchant at one of the merchant terminals 16. It should be noted that several merchant terminals 16 may be associated with the same merchant for obtaining account information through various modes. In fact, multiple merchant terminals 16 may be associated with a single device used by a merchant for obtaining information at a single POS device. Accordingly, the POS device may obtain information from the payment device by a first mode utilizing a microchip embedded in the device or by additional modes, which may involve the use of the NFC components or magnetic stripe on the device. In other transactions, such as online or telephone transactions, the device number printed and/or embossed on the device may be entered electronically or by an order-taking representative of the merchant.

According to alternative embodiments, the payment system 10 may instead be configured as a system for performing non-payment actions. Instead of conducting various functions related to financial accounts as disclosed herein, the non-payment system may process other types of credentials for entities other than issuing institutions.

The account correlating device 24 uses the database 30 to associate arbitrary substitute account data values to details of a user's valid credential details. The arbitrary substitute account data values and valid credential details may be provided by the user at the time of enrolling in a service provided by the account correlating device 24. In one embodiment, the user may change the valid credential details that are associated to the substitute account at any time using a mobile application on one of the mobile devices 20 or via a web service provided by the account correlating device 24 using a user device 14, which may be a conventional computer or web browser. The account correlating device 24 enables multiple valid credentials to be associated with multiple substitute accounts. The valid credentials may be financial or non-financial credentials. In one embodiment, the account correlating device 24 enables valid credentials from the issuing institution 28 to be associated with the multiple substitute accounts. In one embodiment, the account correlating device 24 enables valid credentials from both issuing institution 28 as well as other financial or non-issuing institutions to be associated with the multiple substitute accounts.

The account correlating device 24 is deployed into the payment system 10 such that all transactions presented by a merchant via one of the merchant terminals 16 for authorization against one of the multiple substitute accounts represented on each device are received by the account correlating device 24. The account correlating device 24 associates the multiple substitute accounts with one or more of the user's valid credentials using a customizable rules engine, which is sensitive to one or more facts including, but not limited to, the current transaction data. The current transaction data may include, for example, but is not limited to, merchant category code, merchant ID, amount of transaction, substitute account number, service code, device security code, etc.

The account correlating device 24 may also have access by way of the database 30 to data including, but not limited to, prior transactions presented for the specific substitute account, prior transactions presented for another substitute account associated with the same user, prior transactions for other users of the same merchant or merchant location, the geographic location of the user's primary mobile phone at the time the transaction is presented. The geographic location may be determined, for example, by the Global Positioning System (GPS), proximity to radio signals such as Wi-Fi™, Bluetooth™, Bluetooth Low Energy beacons, Zigbee™, Zwave™, or any combination of these and other location-sensitive factors. The substitute accounts, which can be associated with a valid credential, have themselves, unless otherwise associated, no balance or established credit and cannot be used to settle any transactions.

The payment system 10 may be used to provide security for the use of a payment device. The payment system 10 may include a first merchant terminal 16 connected to a public network 12, wherein the first merchant terminal 16 is configured to obtain details of a first substitute account from a first set of information associated with a payment device owned by a user. The payment system 10 may include a second merchant terminal 16 connected to the public network 12, wherein the second merchant terminal 16 is configured to obtain details of a second substitute account from a second set of information associated with the payment device. In this embodiment, the payment system 10 also includes an account correlating device 24 connected to the public network 12. The account correlating device 24 is configured to receive the details of the first and second substitute accounts from the first and second merchant terminals 16, respectively. The account correlating device 24 is further configured to associate the first and second substitute accounts to valid credentials belonging to the user. The account correlating device 24 also manages financial transactions between an issuing institution 28, from which the user retains the valid credential, and the first and second merchant terminals 16. Also, it should be noted that the first set of information is preferably different from the second set of information.

The payment system 10 may also include a third merchant terminal 16 connected to the public network 12, wherein the third merchant terminal 16 may be configured to obtain details of a third substitute account from a third and preferably different set of information associated with the payment device. In some embodiments, the first set of information is obtained from a microchip on the payment device, the second set of information is obtained from NFC components embedded in the payment device, the third set of information is obtained from a magnetic stripe on the payments device, and the fourth set of information is obtained from card numbers printed and/or embossed on the payment device. The first, second, third, fourth and other sets of information may be generated by the issuing institution. Some of these sets of information may be manually entered into a merchant terminal.

An alternative embodiment includes the payment system 10 in which the payment device is devoid of a printed and/or embossed account number. Also, the payment device may be devoid of a magnetic stripe, or one of the other modes. In this case, the user may use the payment device at a merchant terminal using only the microchip and/or NFC components, or the modes remaining on the device.

A different set of account details may be communicated to the user for conducting an online or telephone transaction. The different set of details may be mailed, emailed, or texted to the user via a computer (e.g., user device 14) and/or via a mobile device 20.

In some embodiments, the mobile device 20 associated with the user may be incorporated in the payment system 10. One of the merchant terminals 16 may be an online merchant device configured to conduct an online transaction, and the mobile device 20 may be configured to store, retrieve one generated from the account correlating device 24 or calculate a dynamic card verification value (d-CVV), which is transmitted to, or manually entered into, the online merchant device. In some cases, one or more of the merchant terminals 16 may be embedded within point-of-sale (POS) devices.

The user device 14 associated with the user is configured to enable the user to manage the substitute accounts and the valid credentials via the account correlating device 24. The account correlating device 24 is configured to enable the user to enter enrollment information, monitor the activities of the substitute accounts, enable and disable one or more modes of conducting transactions with the payment device, report if the payment device has been lost or stolen, and provision information related to the various valid credentials. For example, the account correlating device 24 may provide a website including one or more webpages enabling the user to navigate the website potentially using the user device 14.

Figure 2A:
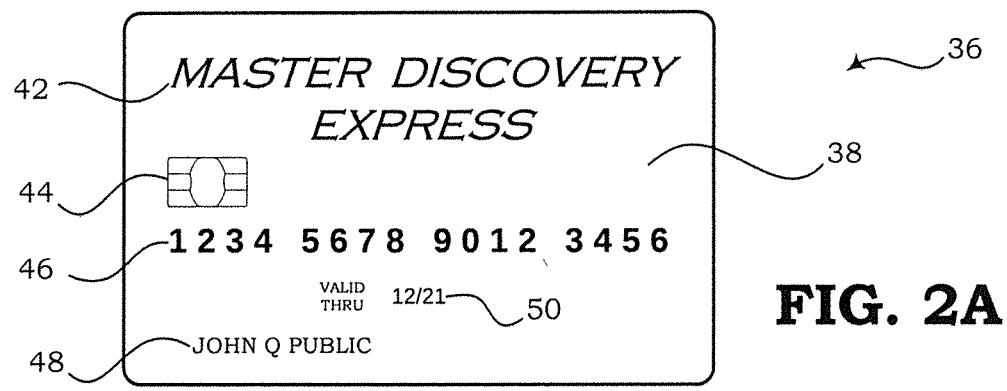
FIGS. 2A and 2B are diagrams illustrating a front view and back view, respectively, of a first payment device according to various implementations of the present disclosure.
Figure 2B:
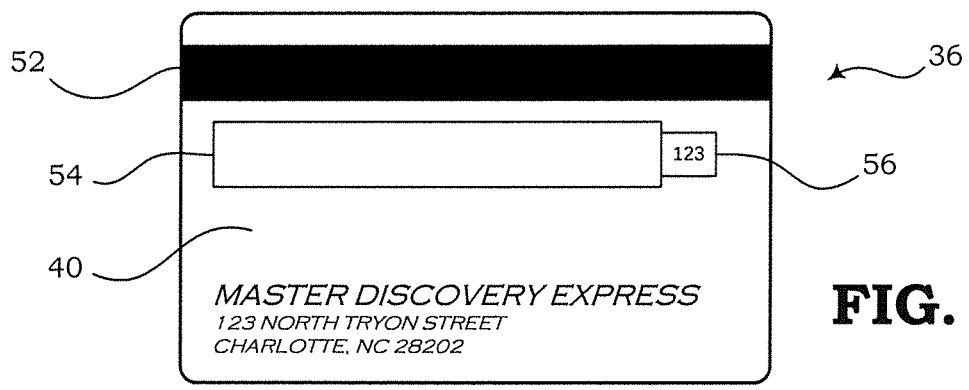

FIGS. 2A and 2B illustrate a first type of payment device 36 according to various embodiments of the present invention. FIG. 2A shows a front side 38 of the payment device 36 and FIG. 2B shows a back side 40 of the payment device 36. The payment device 36 may include a name 42 of the issuing institution 28, a microchip 44, a device number 46, a customer name 48, and an expiration date 50 on the front side 38 of the payment device 36. In some embodiments, the device number 46 may be embossed on the payment device 36. In addition, the back side 40 of the payment device 36 may include a magnetic stripe 52, a signature box 54, and a card verification value (CVV) 56. The payment device 36 may further include NFC components, which may be embedded under the surface of the payment device 36, for enabling touchless transactions.

In one embodiment, the payment device 36 may be a plastic EMV microchip card that is issued by an issuing bank according to the issuing rules for one of several global branded payment networks. The payment device 36 includes provisioning and personalization such that it may be used at any EMV-enabled merchant POS.

However, the account details included in the microchip 44, or other modes, are not those of the primary account number, but rather are arbitrary values generated by the issuing institution. The account details may be referred to herein as "substitute account details." The substitute account details are used as a stand-in for a valid credential but do not identify any particular user. They refer instead to a substitute account generated by the issuing institution but not associated with any particular valid credential.

In the embodiment of FIG. 2, the microchip 44 and magnetic stripe 52 contain distinct payment account numbers, expiration dates, and other token account details for two different substitute accounts. Simply, the microchip 44 and magnetic stripe 52 appear to represent completely distinct payment accounts. A transaction performed with the microchip 44 at an EMV-enabled merchant will contain different account details than a transaction performed at a merchant using the magnetic stripe 52 on the same device 36. Also, an NFC transaction may utilize payment account details that differ from the both the EMV-enabled mode and the magnetic stripe mode.

In one embodiment, the issuing institution 28 provides the customer with substitute account details for use in electronic commerce and telephone commerce transactions such that the details are distinct from either the substitute account details for the microchip 44 or the magnetic stripe 52. It will be appreciated that facsimile, electronic mail, and other forms of electronic and telephone communication may also be used. It will also be appreciated that the substitute account details may be recorded on a mail order form for transactions conducted through the mail. The electronic commerce substitute account details may not be printed or embossed on the payment device 36 but provided separately to the user, or may be printed or embossed on the payment device, depending upon the embodiment.

Figure 3A:
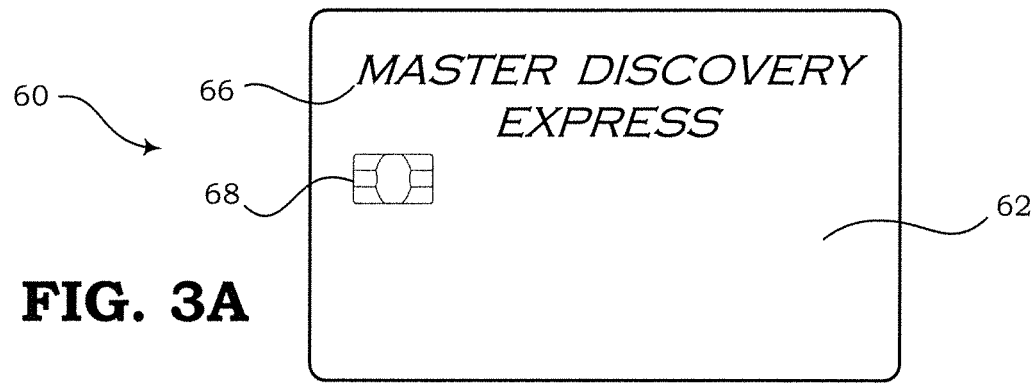
FIGS. 3A and 3B are diagrams illustrating a front view and back view, respectively, of a second payment device according to various implementations of the present disclosure.
Figure 3B:

FIGS. 3A and 3B illustrate a second type of payment device 60 according to various embodiments of the present invention. FIG. 3A shows a front side 62 of the payment device 60 and FIG. 3B shows a back side 64 of the payment device 60. The payment device 60 may include a name 66 of the issuing institution and a microchip 68 on the front side 62 of the payment device 60. It should be noted that the payment device 60 is devoid of a device number and the user's name that may normally appear on a conventional payment device. The back side 64 of the payment device 60 may be blank or may simply include a name and address of the issuing institution. The back side 64 is therefore devoid of a conventional magnetic stripe and CVV number. The payment device 60 has no pre-printed account number, embossed account data, expiration data, user name, or other account data. By making the device anonymous and without including a human-readable account number, the trivial theft of account data from the face and back of the device can be prevented.

Currently, Visa™ and MasterCard™ include rules for cards and other devices issued under their franchise agreements that require the user's name and account number to be displayed on the device. Therefore, the embodiment of FIG. 3 does not follow these present day rules. Nevertheless, the payment device 60 as described in the present disclosure can be carried in public without the risk of being lost or stolen, since the user name and account number cannot be retrieved visually. For online, mail order, telephone, and similar transactions, a separate device or electronic file can be safely stored at the user's home.

In some embodiments, the payment devices 36, 60 may be formed from a plastic substrate ("card"). A first component (e.g., the microchip 44) may be incorporated into the plastic substrate on the cards shown in FIGS. 2 and 3. The first component may be configured to provide details of a first substitute account associated with a user's valid credentials. The payment card 36 of FIG. 2 may also include additional components incorporated into the plastic substrate. The additional components are configured to provide details of additional substitute accounts associated with the user's valid credentials. The first substitute account includes details that are distinct from the details of the second substitute account and are distinct from all additional substitute accounts. At least one of the first, second or additional substitute accounts is provided to a merchant (e.g. using a merchant terminal 16) for conducting a financial transaction with the merchant The merchant is configured to communicate the details of at least one of the substitute accounts to the account correlating device 24 via the network 12. The account correlating device 24 is configured to associate at least one of the substitute accounts to one of the user's valid credentials, and wherein the account correlating device 24 is further configured to manage financial transactions between the issuing institution 28 associated with the user's primary financial account and the merchant terminal 16 associated with the merchant.

According to some embodiments, the payment device 36 of FIG. 2 may further include an additional component (e.g., device number 46) incorporated in the plastic substrate. The device number can be printed and/or embossed on the plastic substrate. In alternative embodiments, the payment device (e.g., payment card 60) may be devoid of at least one of a printed or embossed account number, a magnetic stripe, and or other modes.

The details of the first, second and additional substitute accounts may be read from the first, second, and additional components by a point-of-sale (POS) device, such as the merchant terminal 16. In order to conduct a financial transaction, some implementations may include use of the mobile device 20, which is associated with the user.

Figure 4:
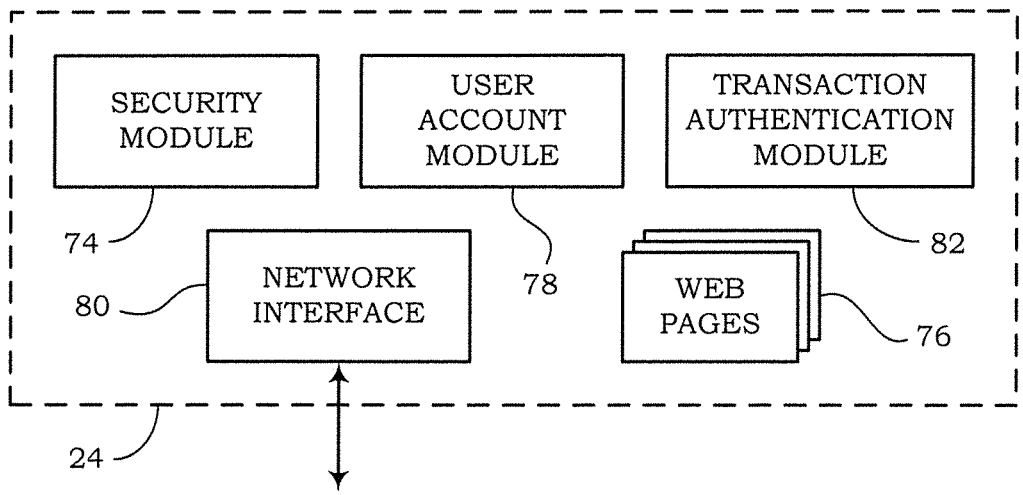
FIG. 4 is a block diagram illustrating the account correlating device shown in FIG. 1 according to various implementations of the present disclosure.

FIG. 4 is a block diagram showing an embodiment of the account correlating device 24 shown in FIG. 1. In the embodiment of FIG. 4, the account correlating device 24 includes a security module 74, one or more web pages 76, a user account module 78, one or more network interfaces 80, and a transaction authentication module 82. The one or more network interfaces 80 are configured to enable communication on the first public network 12 and also to enable communication on the network 26. The user account module 78 allows a user, or customer, to perform a number of different actions related to the financial account and how the payment device 36, 60 can be used. The user account module 78 is described in more detail below with respect to FIG. 5.

The security module 74 may include a random number generator for generating a temporary dynamic card verification value (d-CVV). The d-CVV may be communicated to the mobile device. Also, the security module 74 may include an encryption engine for encrypting data transmitted over the public network 12. The account correlating device 24 may be configured as a web server that allows one or more users to access information from the web pages 76 and to establish a secure connection to enable the transfer of sensitive data, such as user information, device numbers, etc. The transaction authentication module 82 is configured to authenticate a financial transaction using the payment device 36, 60.

In one embodiment, the token account details are protected by encryption using a cryptographic key, which can be provided by the security module 74. In one embodiment, the cryptographic key is derived from a user created password. In another embodiment, the cryptographic key may instead depend on other data, including, but not limited to, the identity of the mobile device 20, the user's identity number known to the security module 74 of the account correlating device 24, the country in which the user registered for the computing service, a master key controlled by biometric authentication of the user, such as fingerprint, iris scan, facial or voice recognition, or biorhythmic pattern matching one or more body rhythms including, but not limited to, pulse rate, epidermal conductivity, iris size, blink rate, encephalography, electrocardiography, or other factors that are independently or in combination considered as biomarkers for individuality.

Normal plastic cards may have a single three- or four-digit CVV imprinted on either the back or front of the card. Electronic commerce sites now routinely ask for this value to ensure the user has the card in their possession. But since the CVV is a short number printed on the card, it can easily be stolen together with the account data. Therefore, use of a dynamic CVV (d-CVV), which may be generated by the security module 74 at the time of the transaction, and good for only one transaction, prevents this form of theft. In some embodiments, instead of using the generated d-CVV for only one transaction, the d-CVV may apply to multiple transactions associated with a specific merchant or may be used multiple times according to other criteria, such as a range of days, certain days of the week, area code of merchant, category of purchase, etc. According to some embodiments, a mobile application running on a mobile device 20 associated with the user may be configured to retrieve the d-CVV on demand. In another embodiment, a mobile application running on a mobile device 20 associated with the user may configured to generate the d-CVV on demand. Alternatively, a web site provided by the account correlating device 24 may be used when the mobile device 20 is unavailable. Therefore, in this case, the account correlating device 24 may generate the d-CVV.

In addition to use during financial transactions, the payment system 10 may alternatively be applied to non-payment uses. For example, the payment system 10 may be used for replacing some form of identifier with a token or substitute identifier. Such identifiers might include social security numbers (in the U.S.), public health identification numbers, loyalty programs, other forms of account numbers where a risk of disclosure, identity theft, or other fraud might be possible using the genuine number.

The account correlating device 24 may also find application to provide limited transaction access to protected record sets such as medical records requests, laboratory results, credit inquiries, professional licensing, commercial licensing, and other forms of relying party inquiries which utilize a government or enterprise issued identifying account number.

The payment system 10 may also be used in some transactions for non-payment uses which could include driving licenses, border control documents, building and resource access cards, and gift cards. In this embodiment, the payment device 36, 60 may use one or more of the modes for non-payment uses while still using one or more of the modes for payment transactions using separate substitute account details for different modes.

In some embodiments, the account correlating device 24 may include at least one network interface 80 configured to communicate with a plurality of merchant terminals 16 via the first public network 12 and to communication with the issuing institution 28 via the network 26. For example, the issuing institution 28 may be a bank that issues the payment device 36, 60 to the user. The account correlating device 24 may also include the transaction authentication module 82 configured to authenticate a first financial transaction for a first merchant terminal of the plurality of merchant terminals 16 based on a first set of details obtained by the first merchant terminal of a first substitute account associated with a payment device 36, 60 owned by a user. The transaction authentication module 82 may be further configured to authenticate a second financial transaction for a second merchant terminal of the plurality of merchant terminals 16 based on a second, different set of details obtained by the second merchant terminal of a second substitute account associated with the payment device 36, 60 owned by the user.

The transaction authentication module 82 may be further configured to determine if the substitute accounts correspond to valid credential of the user. The transaction authentication module 82 may be further configured to determine if the received substitute account details correspond to the expected substitute account details for the mode of payment device that was used. The transaction authentication module 82 is further configured to manage financial transactions between the issuing institution 28 and the first and second merchant terminals 16. The transaction authentication module 82 is further configured to authenticate additional financial transactions for additional merchant terminals of the plurality of merchant terminals 16 based on additional set of details obtained by the additional merchant terminals of additional substitute accounts associated with the primary account of the payment device 36, 60 owned by the user. The first set of details may be obtained from a microchip 44 on the payment device 36, 60, the second set of details may be obtained from a magnetic stripe 52 on the payment device 36, and a third set of details may be obtained from account numbers 46 printed and/or embossed on the payment device 36.

The network interface 80 may be further configured to communicate with a remote device (e.g., user device 14 or mobile device 20) associated with the user via the network 12. The network interface 80 may be further configured to receive instructions from the remote device 14, 20 to enable the user to manage a primary account associated with the payment device 36, 60, wherein managing the primary account includes at least one of entering enrollment information 86, monitoring 94 the activities of the primary account, enabling and disabling 90 one or more modes of conducting transactions with the payment device, reporting 92 that the payment device has been lost or stolen, and provisioning 88 information related to the first and second substitute accounts.

Figure 5:
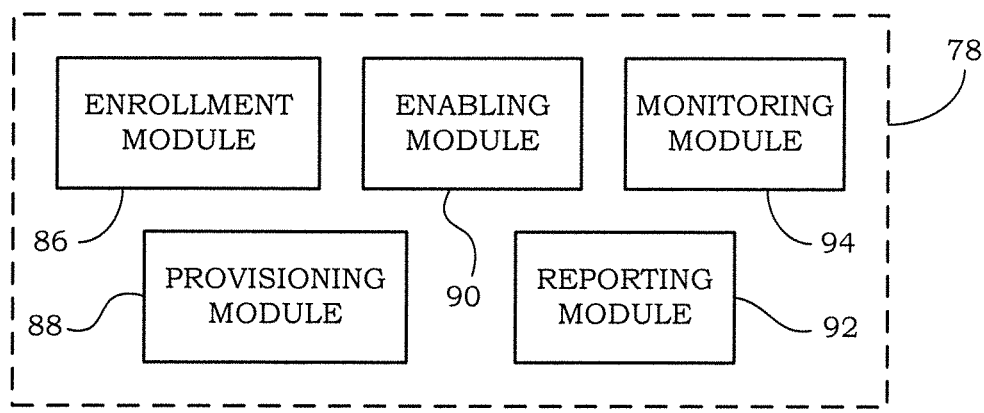
FIG. 5 is a block diagram illustrating the user account module shown in FIG. 4 according to various implementations of the present disclosure.

FIG. 5 is a block diagram showing an embodiment of the user account module 78 shown in FIG. 4. In this embodiment, the user account module 78 includes an enrollment module 86, a provisioning module 88, an enabling module 90, a reporting module 92, and a monitoring module 94. A user may access the user account module 78 using a mobile application running on the user's mobile device 20 or by accessing a web site provided by the account correlating device 24 using the user's user device 14.

The user account module 78 enables the user to establish and manage rules which the account correlating device 24 implements on the user's behalf. Such rules may be sensitive to one or more facts known to the user, including, but not limited to, payment value, merchant ID, local time and date encoded in a transaction message, the distance of registered location of the merchant from the geographic location of the user's mobile device at the time of the transaction, the local currency of the transaction, the country in which the transaction is originated, the country in which the merchant is established, whether the transaction is presented as a magnetic stripe transaction, as an EMV transaction, or as an electronic commerce, telephone, or mail order transaction, and the method of user verification such as one or more of, but not limited to, entry of a personal identification number (PIN) code into the merchant POS terminal, signing a receipt, entering a passcode into a mobile device, and fingerprint or other biometric identification method.

The enrollment module 86 may be configured to enable a user (who, among others, may be the cardholder, valid credential holder, or an appropriately approved individual of the issuing institution) to enroll additional substitute accounts and additional valid credentials. The enabling module 90 may be used to allow the user to enable or disable certain modes or types of transactions depending on the various uses that the user may anticipate based on various criteria, or to enable or disable specific transactions themselves, prior to their authentication. The enabling module 90 may be used to allow the user to nominate which valid credential a payment will be charged against in a variety of scenarios or criteria. The reporting module 92 allows the user to report if the payment device 36, 60 has been lost or stolen. One embodiment of the reporting module 92 may enable the account correlating device 24 to report manually or automatically relevant information to the user or issuing institution 28, including reporting potentially fraudulent activity across the substitute account details and/or payment device. The monitoring module 94 allows the user to view previous transactions to monitor all activity of the device.

The provisioning module 88 may allow the user to separately distinguish the multiple different sets of substitute account details. Conventional device issuing systems may assume that certain data elements are shared among the microchip, magnetic stripe, and printed/embossed account number. However, as opposed to the conventional device issuing systems, the provisioning module 88 allows the provisioning of each of these modes and further elements and/or modes using separate data elements. The provisioning module 88 is configured to separately identify these multiple distinct sets of substitute account data, which may be stored in a common provisioning data file conveyed during card or device provisioning steps.

A user may become subject to unauthorized use of their payment device 36, 60 if it is lost or stolen. However, although in some countries a thief may be able to use the NFC features for purchases under to certain spending threshold (e.g., $100), the thief will normally not be able to use the EMV features of the device without the user's PIN code, which can be entered during the provisioning process using the provisioning module 88. Also, the stolen device cannot be used for electronic or telephone commerce due to the distinct account details for this separate transaction mode.

The provisioning module 88 may further include receiving identifying information of the user that is not printed on the payment device 36, 60. According to some embodiments, the provisioning module 88 may set up the user's usage rules by requiring the presence of the user's mobile device 20 in conjunction with the transaction using the payment device 36, 60. Also, the mobile application of the mobile device 20 may be used to instantly block transactions from a stolen device that is reported stolen by the reporting module 92. The user account module 78 might configure its rules to prevent magnetic stripe transactions unless they are unlocked each time by the user using the mobile application on the mobile device 20. This latter method would effectively prevent the use of counterfeit magnetic stripe devices. The user account module 78 might also configure its rules to prevent transactions from any and all different modes, or to prevent transactions that fall under certain criteria, unless they are unlocked each time by the user.

In one embodiment, a mobile application is available on the user's primary mobile device 20. The mobile application may be used by the user to enroll a substitute account or valid credential into the account correlating device 24, control the provisions or associations of the valid credentials with the one or more substitute account details provisioned to the payment device. The mobile application also allows the user to enable or disable the authorization of transactions presented with any of the substitute accounts provisioned to the plastic payment device, report the payment device as lost or stolen, and as an additional authentication factor for sensitive or high-value or high-risk transactions.

The mobile device 20 may also store substitute account details, which may be associated with "card present" transactions and "card not present" transactions, in memory. These substitute account details may be stored in the memory and can be recalled by the user by entering a password and/or another authentication factor into the mobile device 20. As a means for interacting with electronic commerce sites, the mobile application securely holds the electronic commerce substitute account details and displays them for the user upon proper authentication with password, biometrics, and/or other factors. In another embodiment, the substitute account details are transmitted by account correlating device 24 and are received by the mobile device 20, which can then be recalled by the user by entering a password and/or another authentication factor into the mobile device 20.

Figure 6:
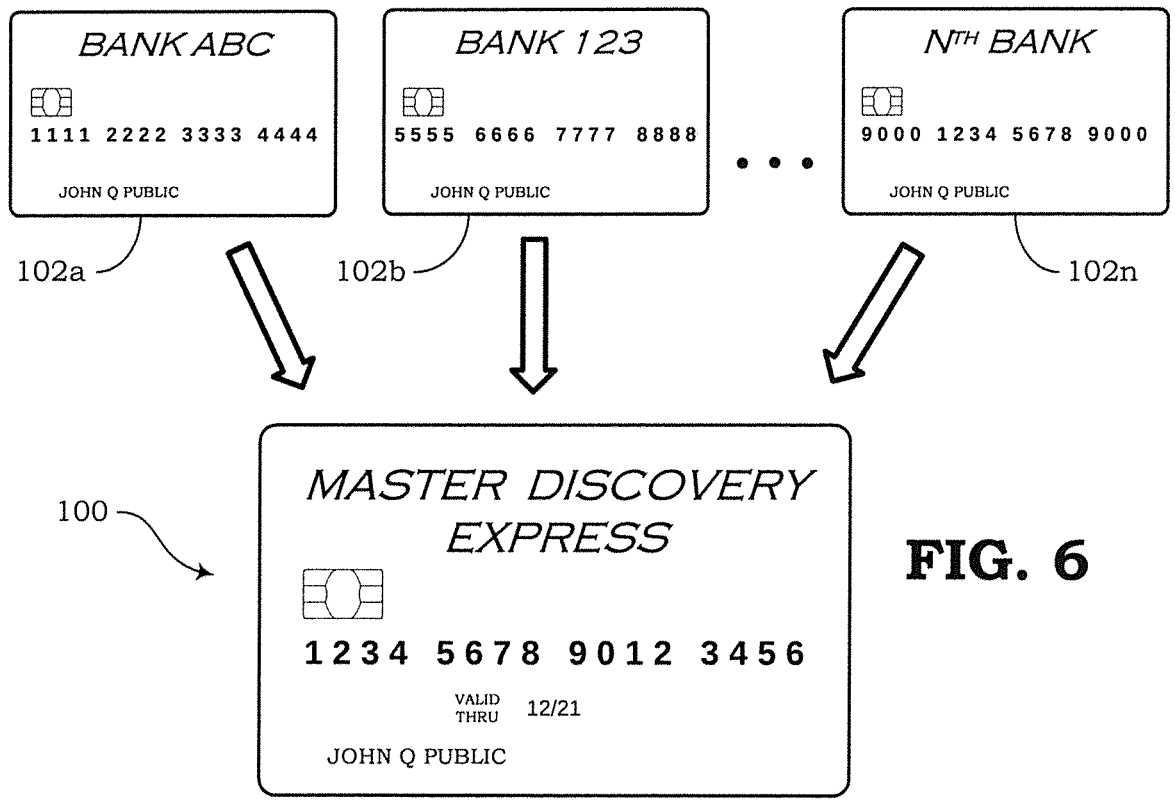
FIG. 6 is a diagram illustrating a proxy device that represents a plurality of cards according to various implementations of the present disclosure.

FIG. 6 shows is an example of a proxy device 100 that is configured to represent a plurality of valid credentials 102a, 102b, . . . , 102n. The details of each of the valid credentials 102a, 102b, . . . , 102n are combined into the single proxy device 100, which can then be used in place of any of the valid credentials 102a, 102b, . . . , 102n. The valid credentials 102 may be credit cards, debit cards, loyalty cards, membership cards, identification cards, health insurance cards, gift cards, and other cards that include account information, identity information, and other types of data. During use, the user who is issued the single proxy device 100 can select any one of the sets of valid credentials for normal use as if the actual valid credential 102 were present.

In some embodiments, the proxy device 100 may include one or more microchips, one or more contactless circuits (e.g., NFC circuits), a magnetic stripe, printed and/or embossed substitute account numbers, and/or a CVV number. The proxy device 100 may also include printed information that identifies the user, such as the user's name and contact information.

Figure 7:
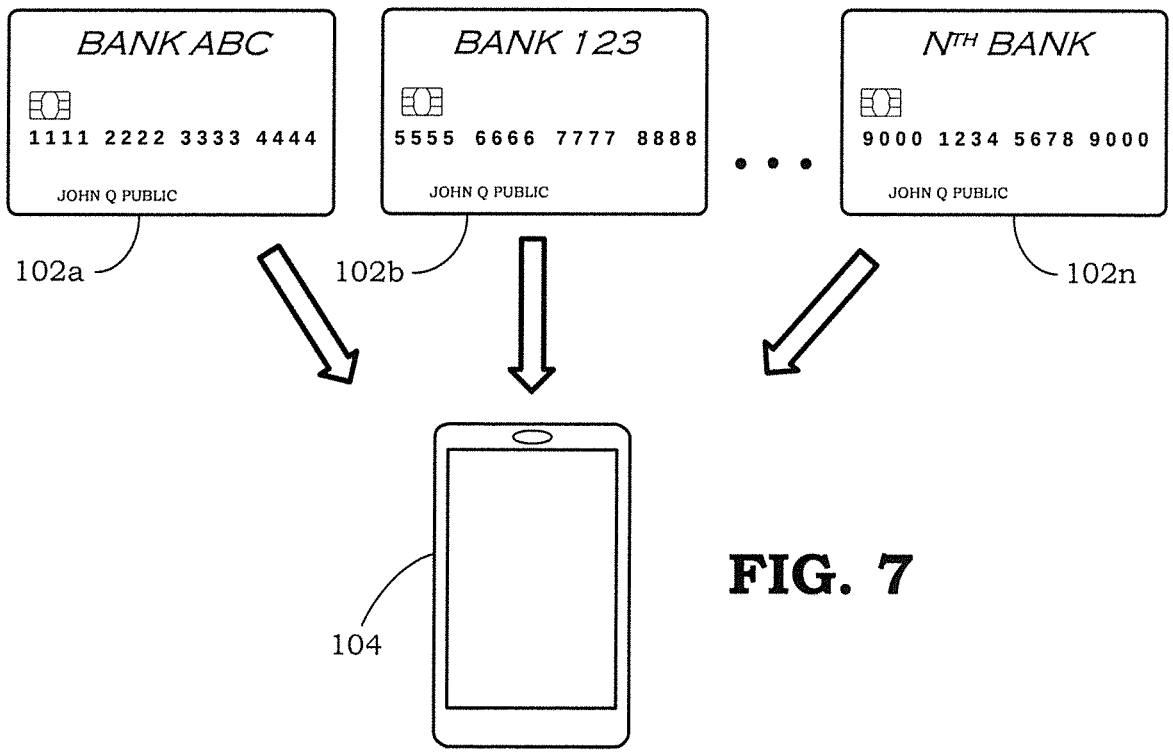
FIG. 7 is a diagram illustrating a mobile proxy device that represents a plurality of devices according to various implementations of the present disclosure.

FIG. 7 shows an example of a mobile proxy device 104, which may be configured to represent any number of valid credentials 102a, 102b, . . . , 102n, as described above. Instead of being configured in the form of a credit card, the mobile proxy device 104 may be constructed as a mobile phone, smart phone, tablet, wearable mobile device, or another suitable processor-based mobile device. In some embodiments, the mobile proxy device 104 may include software and/or firmware that is downloaded to an existing mobile phone, smart phone, tablet, wearable mobile device, etc. During use, the mobile proxy device 104 may be tapped on a NFC-enabled reader or used in another manner according to other methods as described in the present disclosure.

Figure 8:
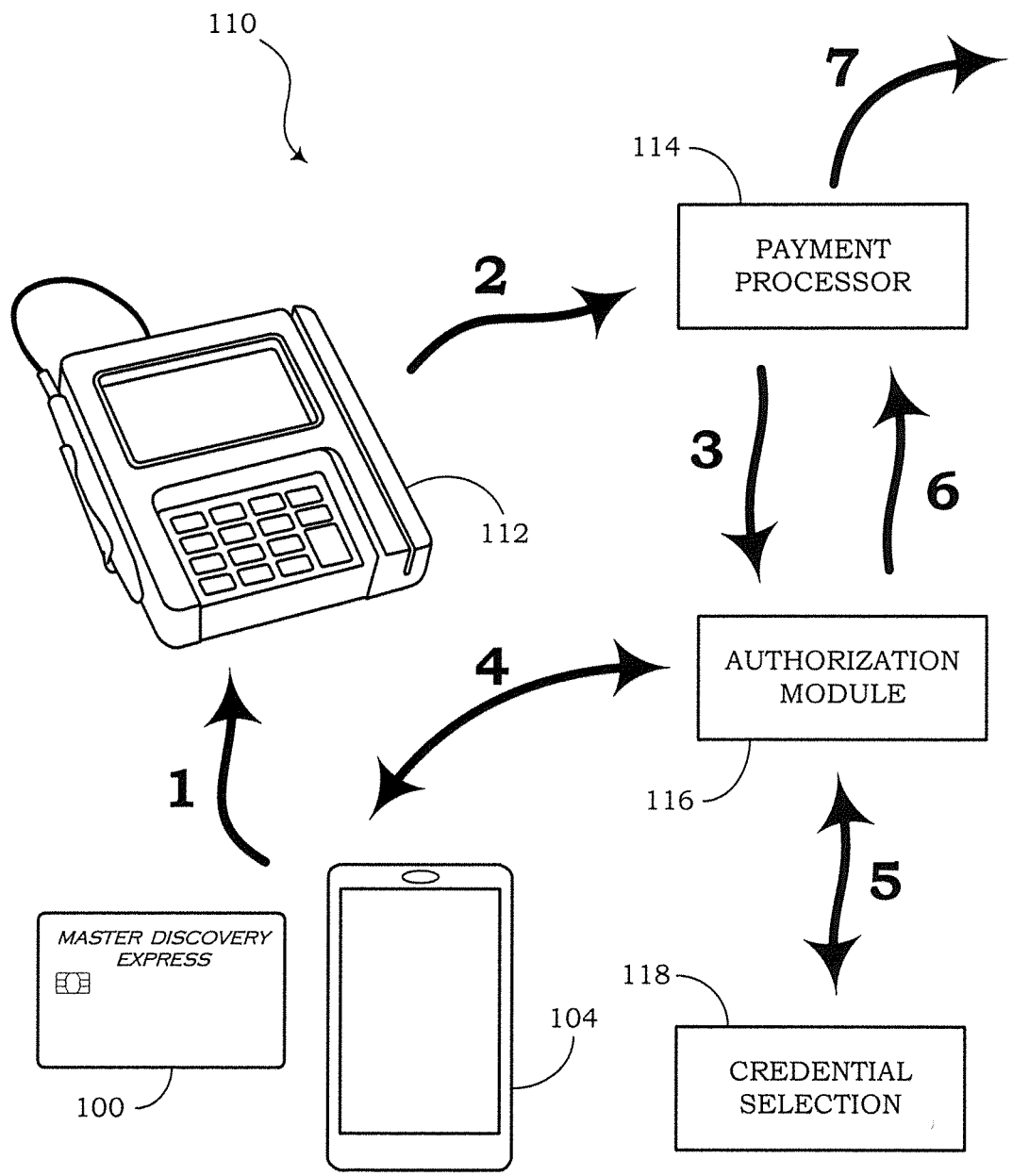
FIG. 8 is a flow diagram illustrating the general utility of the proxy devices of FIGS. 6 and 7 allowing selectable credentials according to various implementations of the present disclosure.

FIG. 8 is a flow diagram illustrating an embodiment of a method 110 for enabling a transaction that exceeds a predetermined threshold value. For example, the threshold value may be established by the user or by the issuing institution based on preferences or predetermined rules based on the financial stability of the user. In one example, the threshold value may be set to $100. Therefore, any pending financial transaction that exceeds $100 will execute the method of FIG. 8.

In operation, a reading step (1) is conducted between the proxy device (e.g., proxy card 100 or mobile proxy device 104) and a reader 112 associated with a merchant. The reader 112 may be one embodiment of the merchant terminals 16 shown in FIG. 1. The reading step (1) involves handing the proxy device 100, 104 to a cashier or the customer using the proxy device 100, 104 himself or herself. The proxy device 100, 104 is swiped through a magnetic stripe sensor of the reader 112, tapped on a NFC sensor of the reader 112, inserted into a chip slot of the reader 112, or otherwise manipulated to enable the reader 112 to read the financial information stored in the proxy device 100, 104.

In step (2), a bank identification number (BIN) number associated with the proxy device 100, 104 is transmitted to a payment processor 114, which may be a third party representative for handling various credit and debit transactions for an acquiring bank associated with the merchant. The payment processor 114, for example, may be a suitable processor for handling the single card or proxy device. In step (3), an authorization process is conducted, which includes the payment processor 114 flagging the user payment for authorization by an authorization module 116, such as Padloc™ or another authorization module. The transaction details are sent to the authorization module 116, which may include an application that has been downloaded on the user's mobile device 20. In some embodiments, the mobile device 20 may be the same device as the mobile proxy device 104 for both initiating a transaction (step (1)) and receiving authorization (step (3)).

Step (4) of the method 110 includes communicating to the user to receive a selection of one of the plurality of valid credentials 102 that are represented by the single proxy device 100, 104. The authorization module 116 receives the user's selection along with any PIN number or other security codes needed to complete the transaction. In step (5), the authorization module 116 includes securely retrieving the details of the selected credential from a credential selection database 118.

In step (6), the authorization module 116 sends payment information with the BIN number to the issuing institution of the selected card. The payment processor 114 receives the payment information and BIN number information and transmits the information to the appropriate issuing institution to process the payment (step (7)).

Figure 9:
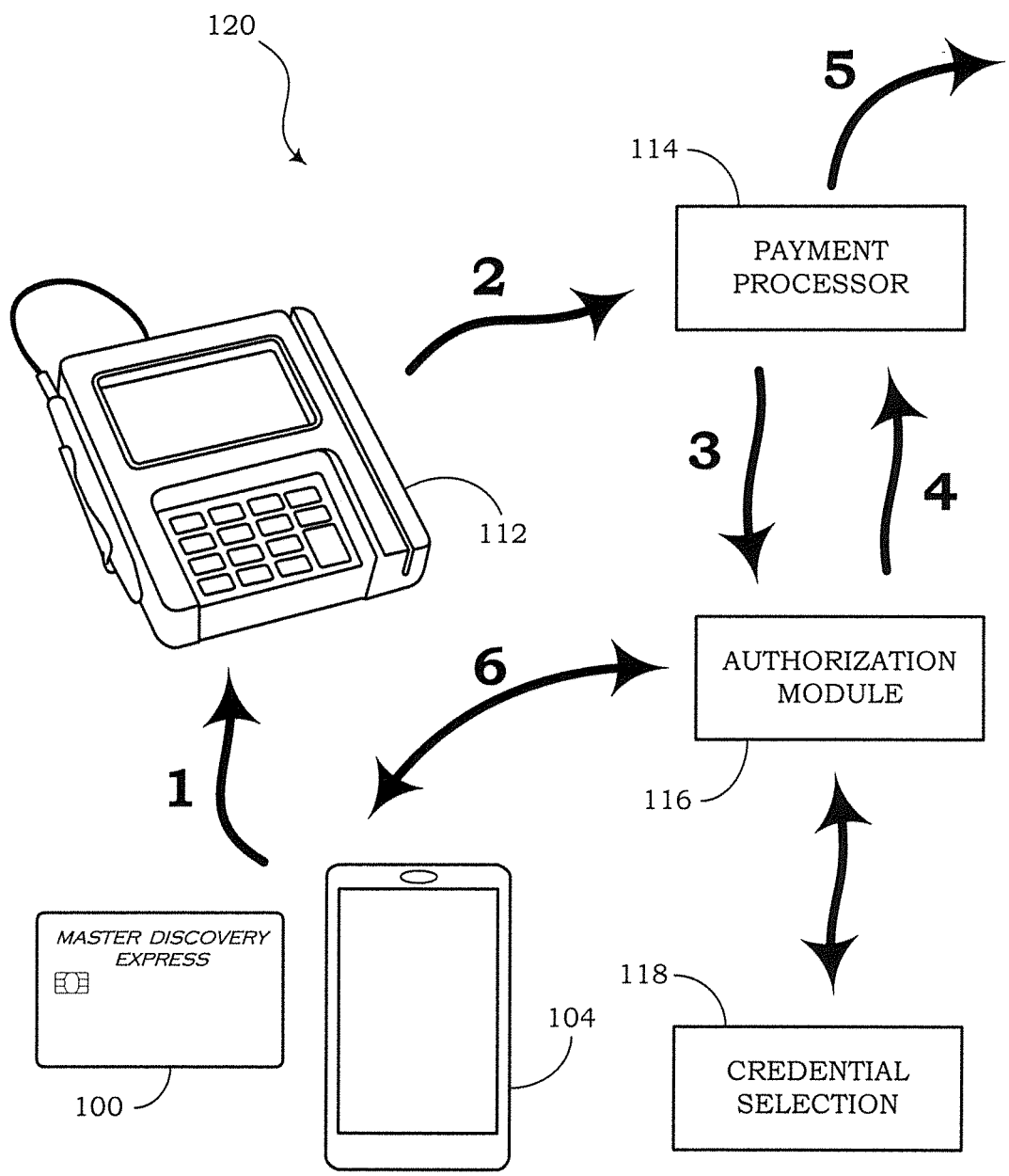
FIG. 9 is a flow diagram illustrating the general utility of the proxy devices of FIGS. 6 and 7 in a default mode according to various implementations of the present disclosure.

FIG. 9 is a flow diagram illustrating another embodiment of a method 120 for enabling a transaction that is below the predetermined threshold value mentioned with respect to FIG. 8. According to the example mentioned above in which the threshold value is set to $100, any pending financial transaction that is below $100 will execute the method of FIG. 9. In this embodiment, the user may pre-select a valid credential to be used when the transaction is below the threshold. In this way, a smaller transaction can be simplified without some additional steps described with respect to FIG. 8.

The devices shown in FIG. 9 may be the same devices as those of FIG. 8. Also, steps (1) and (2) of FIG. 9 are the same as those of FIG. 8 and will not be repeated here. Step (3) involves, however, involves sending user payment preferences identified and the selected valid credential is retrieved from the credential selection 118. Step (4) includes sending payment information with the BIN number for the issuing institution of the pre-selected valid credential, which is sent to the payment processor 114. Step (5) includes processing the payment as usual.

Figure 10:
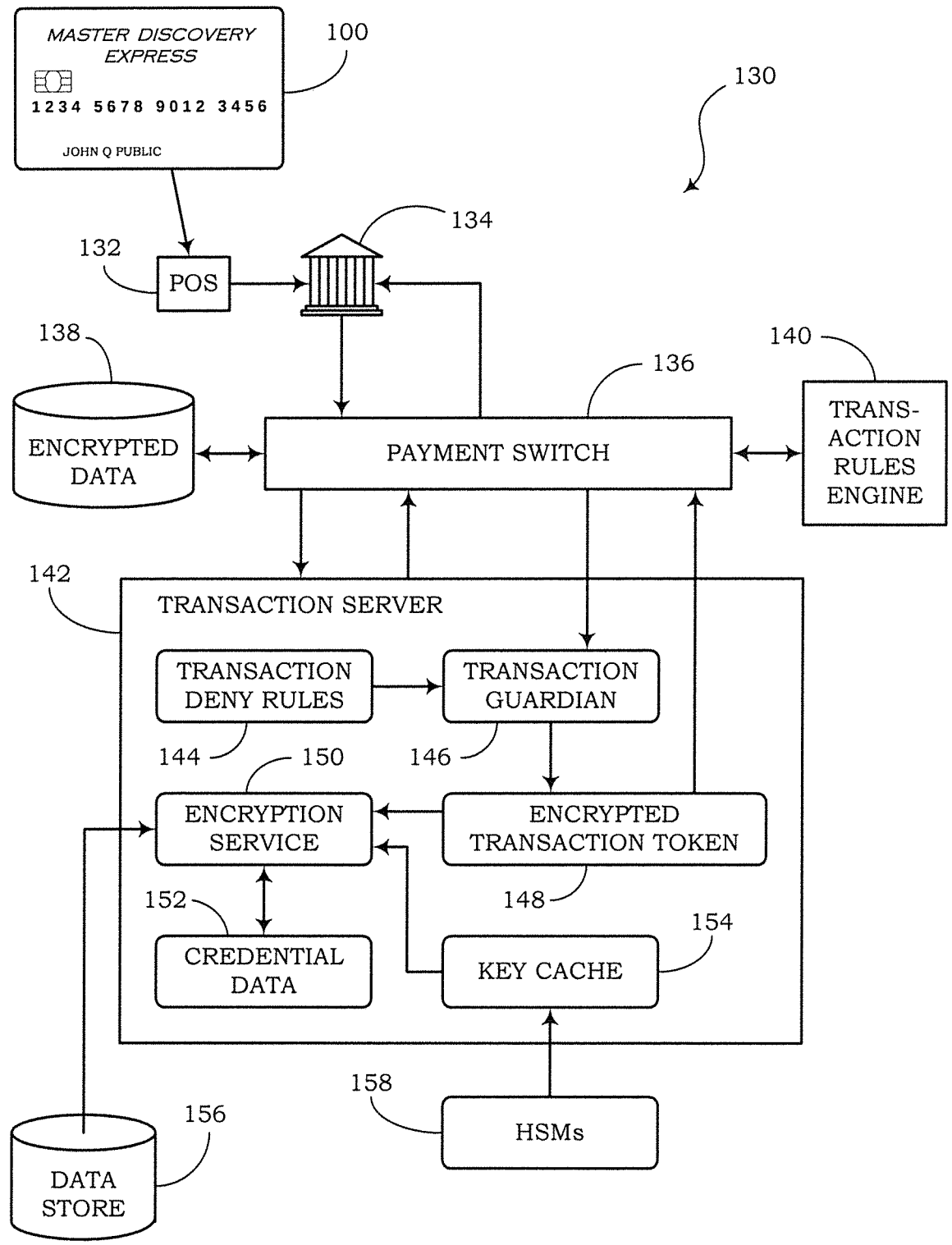
FIG. 10 is a flow diagram illustrating a detailed method of operation of the payment system 10 of FIG. 1 according to various implementations of the present disclosure

FIG. 10 illustrates an embodiment of a method 130 according to the operations of the present invention. A user uses the proxy card 100 (or mobile proxy device 104) to conduct a transaction at a point-of-sale (POS) device 132. The POS device 132 transmits an encrypted financial message that is compliant with at least one financial transaction standards, including, for example, ISO 8583, ISO 20022, and AS 2805. The encrypted message is received by a merchant acquirer 134, which may be configured to decrypt the message and re-encrypt the message for a payment switch 136, which may be configured to process encrypted and/or tokenized financial transaction messages. Encrypted financial transaction messages may be stored in an encrypted database 138.

The payment switch 136 is configured to forward the original encrypted message from the merchant acquirer 134 to a transaction vault of a transaction server 142 for tokenization. The transaction vault of the transaction server 142 decrypts the original message and transmits the tokenized message back to the payment switch 136. A transaction rules engine 140 may be configured to exchange proxy tokens for target credential tokens. Also, the transaction rules engine 140 may be configured to edit rules as needed.

The payment switch 136 then provides the token of the selected valid credential and requested transaction edits to a transaction guardian 146 of the transaction server 142. The transaction guardian 146 and transaction deny rules are used to validate rules to allow, deny or otherwise act upon a presented transaction. If the transaction is allowed, the transaction guardian 146 passes the original message to the target token according to edit rules. The transaction vault of the transaction server 142 returns an encrypted and edited transaction message to the payment switch 136. Then, the payment switch 136 encrypts the message and sends the encrypted message to the merchant acquirer 134.

Figure 11:
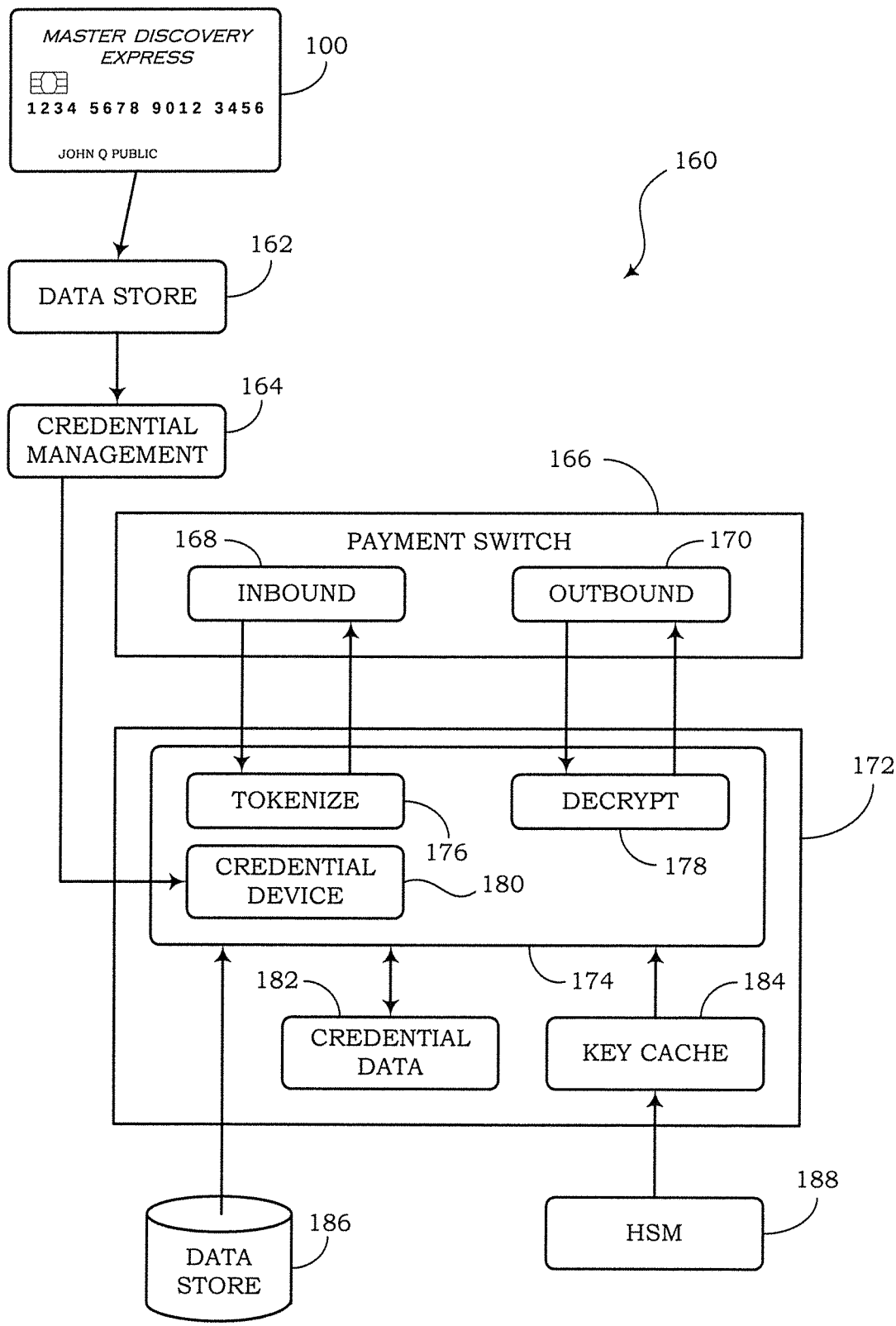
FIG. 11 is a flow diagram illustrating another detailed method of operation of the payment system 10 of FIG. 1 according to various implementations of the present disclosure.

FIG. 11 is a flow diagram of an embodiment of a method 160 for securely storing valid credentials and enabling their access via a proxy device. The method 160 includes using the proxy device (proxy card 100 or mobile proxy device 104) to load valid credential details to a data store 162 of the account correlating device 24. The valid credential details may be obtained using a magnetic swipe reading process or any other process to obtain the substitute account details from the other modes of the payment device. Substitute account details associated with the mode that has been used is sent to a credential management device 164. The credential management device 164 is configured to send the encrypted swipe data to a credential device 180 of a credential transfer device 174 of an issuing institution 172.

A payment switch 166 exchanges inbound data 168 with a tokenize device 176 of the credential transfer device 174 and exchanges outbound data 170 with a decryption device 178 of the credential transfer device 174. The credential transfer device 174 also exchanges encrypted credential data with a data store 186, which stores data in encrypted form. The credential transfer device 174 also exchanges decrypted credentials, decrypted by the decryption device 178, with a credential data store 182. Keys from a key cache 184 are provided to the credential transfer device 174. The keys may include pod specific credential data storage keys, derived tokenization keys, and swiper keys. The HSM 188 provides a swiper key, CMAC per pod, pod specific storage key, and derived tokenization key to the key cache 184.

Figure 12:
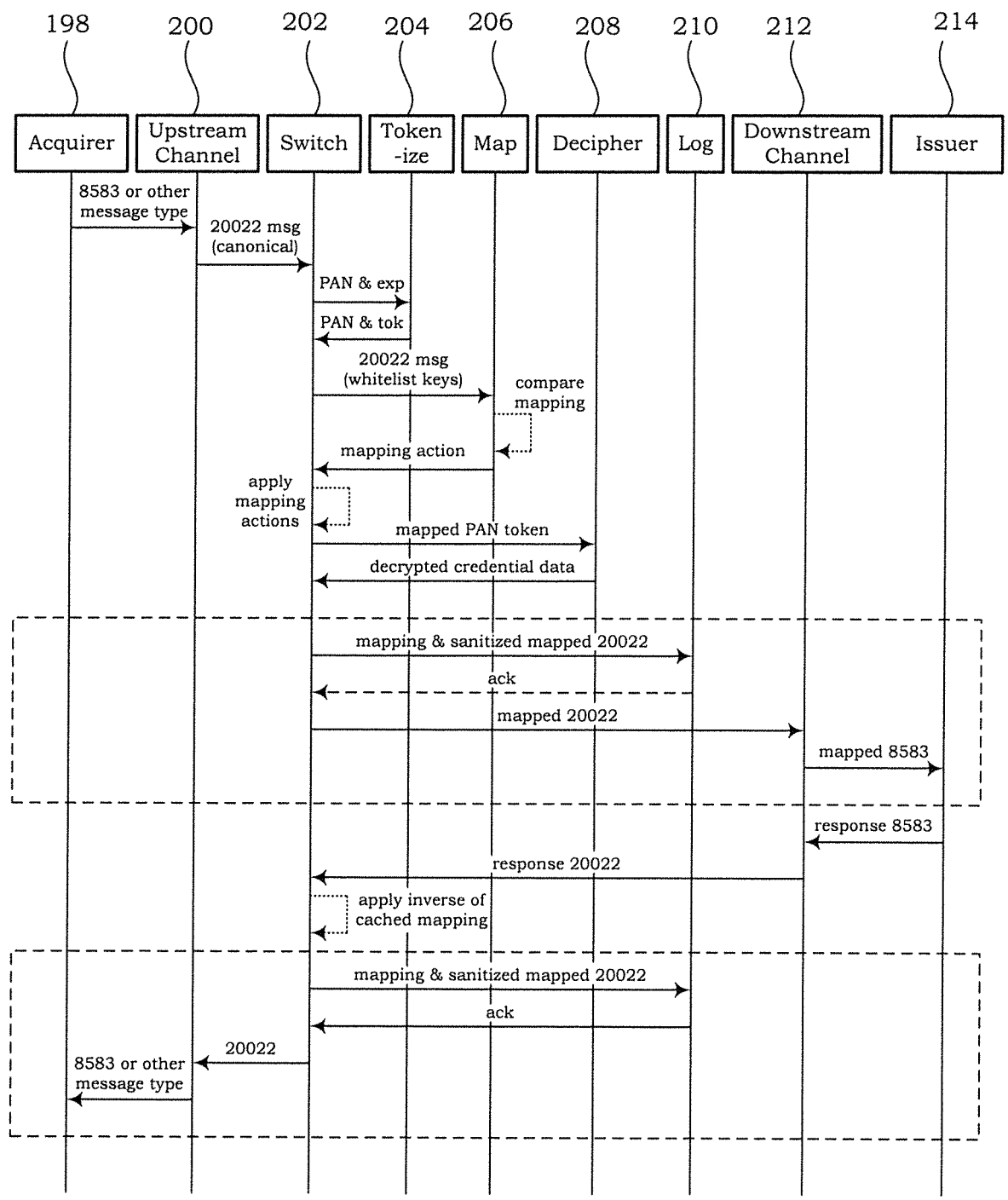
FIG. 12 is a flow diagram illustrating a method of transmitting financial information of a financial transaction according to various implementations of the present disclosure.

FIG. 12 is a method 196 of transmitting financial information of a financial transaction. An acquirer 198 sends a ISO 8583 message or other message type to the upstream channel 200. The upstream channel 200 sends an ISO 20022 message (canonical) to a switch 202. The switch 202 sends PAN and expiration information to a tokenize pod 204 of the account correlating device 24. The tokenize pod 204 sends the PAN and a token back to the switch 202. The switch 202 then sends an ISO 20022 (whitelist keys) to a map pod 206 of the account correlating device 24. The map pod 206 compares the mapping and sends a mapping action back to the switch 202, which then applies the mapping actions. The switch 202 then sends a mapped PAN token to a decipher pod 208 of the account correlating device 24. The decipher pod 208 then sends decrypted credential data back to the switch 202.

The next several steps may be optional in some embodiments and may be related to log transmit functions when related to an atomic ID. The switch 202 sends mapped and sanitized mapped 20022 messages to the log pod 210 of the account correlating device 24. The log pod 210 sends back an acknowledge message to the switch 202. The switch 202 then sends a mapped 20022 message to a downstream channel 212. The downstream channel 212 then sends a mapped 8583 message other other message type to an issuer 214.

The issuer 214 sends a response to the ISO 8583 message or other message type back to the downstream channel 212. The downstream channel 212 sends a response 20022 message to the switch 202, which then applies an inverse of cached mapping.

The next several steps may also be optional and may be related to log transmit functions when related to an atomic ID. As mentioned above, the switch 202 sends the mapped and sanitized mapped 20022 message to the log pod 210 and the log pod 210 responds with an acknowledge signal. In this implementation, the switch 202 then sends the 20022 message to the upstream channel 200 and the upstream channel 200 sends the 8583 message or other message type to the acquirer 198.

Figures 13, 14:
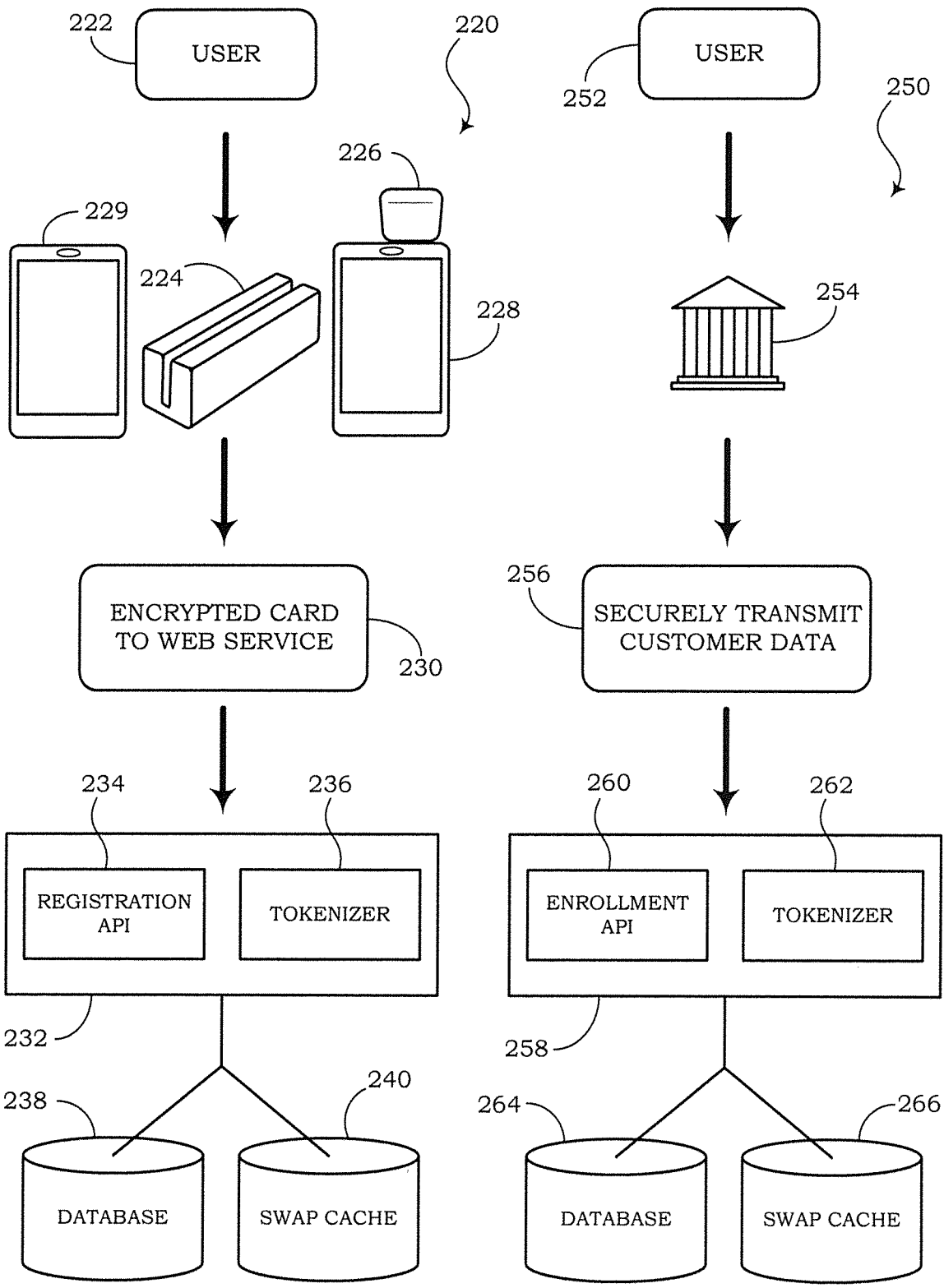
FIG. 13 is a flow diagram illustrating a method of operation of a tokenization process for user registration according to various implementations of the present disclosure.
FIG. 14 is a flow diagram illustrating a method of operation of a tokenization process for enrollment according to various implementations of the present disclosure.
Figure 15:
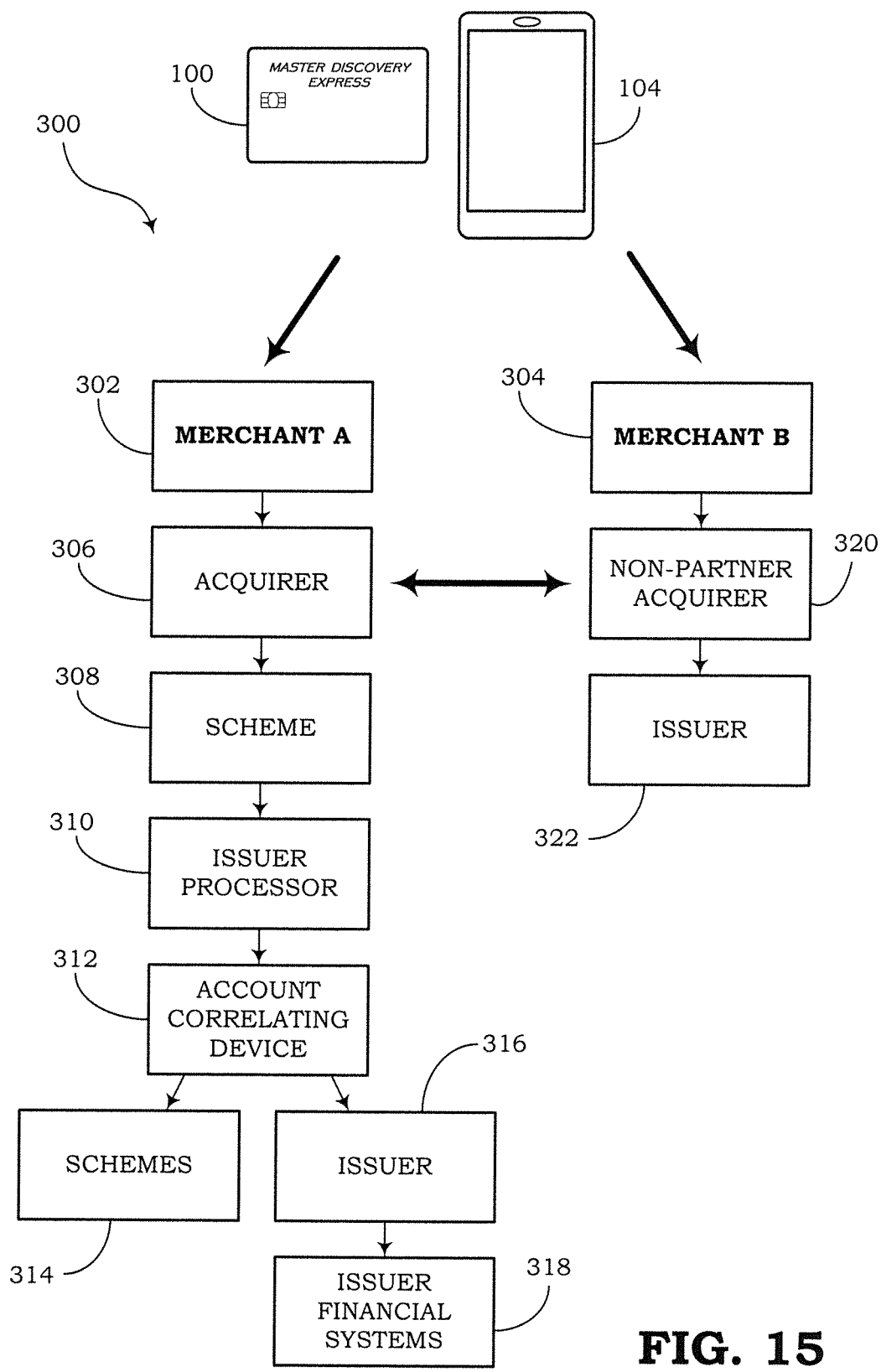
FIG. 15 is a diagram illustrating a transaction flow architecture according to various implementations of the present disclosure.

FIG. 13 is a method 220 of operation of a tokenization process for user registration. A user 222 uses a card swiper 224, swiping attachment 226 connected to a mobile device 228, and/or a mobile device 229 to capture a valid credential.

The encrypted card information is sent to a web service 232, such as the account correlating device 24. The web service 232 includes a registration application program interface (API) 234 and a tokenizer 236. The registration API 234 allows the user to register one or more credentials to associate the credentials to the proxy device 100, 104. The tokenizer 236 assigns a token to the credentials. The registered credentials and tokens are stored in a database 236, such as database 30 shown in FIG. 1. Also, a swap cache 240 may be used to store the mapping of the tokens to the respective credentials.

FIG. 14 illustrates a method 250 of operation of a tokenization process for enrollment. A user 252 may set up an account with a financial institution or issuing institution 254. During an enrollment process, the customer data is securely transmitted 256 from the issuing institution 254 to the account correlating device 258 or other web service. The account correlating device 258, which may correspond to the account correlating device 24 shown in FIG. 1, includes an enrollment API 260 and a tokenizer 262. Enrollment and token data is stored in the database 264 and swap cache 266.

Figure 16:
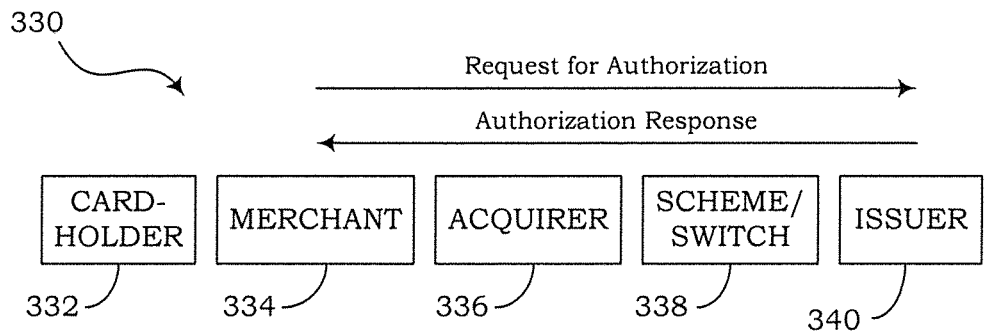
FIGS. 16-20 are flow diagrams illustrating an overview of transaction flow processes according to various implementations of the present disclosure.

FIG. 16 is a diagram illustrating transaction flow. In the first embodiment of this flow, a user presents at the first merchant 302 of the plurality of merchants with a payment device 100. The first merchant 302 originates the payment transaction using the first account details from the user payment device 100 and transmits the financial transaction to the acquirer 306. The acquirer 306 transmits the financial transaction to the issuer processor 310. The acquirer 306 may optionally use the scheme 308 to transmit the financial transaction to the issuer processor 310. The issuer processor 310 transmits the financial transaction to the account correlating device 312 which maps the first substitute account details to the first valid credential and transmits the financial transaction to the issuer of the first valid credential 316. The account correlating device 312 may optionally transmit the financial transaction to the schemes 314 which in turn transmits the financial transaction to the issuer of the first valid credential 316. The response from the issuer 316 follows the reverse path to the merchant 302. In the second embodiment of this flow, a user presents at the first merchant 302 of the plurality of merchants with a payment device 104. The second merchant 304 originates the payment transaction using the second account details from the user payment device 104 and transmits the financial transaction to the non-partner acquirer 320. The non-partner acquirer 320 uses the scheme 308 to transmit the financial transaction to the issuer processor 310. The issuer processor 310 transmits the financial transaction to the account correlating device 312 which maps the second account details to the second valid credential and transmits the financial transaction to the issuer of the second valid credential 316. The SecureOne solution 312 may optionally transmit the financial transaction to the schemes 314 which in turn transmits the financial transaction to the issuer of the second valid credential 316. The response from the issuer 316 follows the reverse path to the merchant 304.

If transactions are conducted with partner acquirers, such as those represented by Merchant A 302, the account correlating device 312 swaps credentials as the partner acquirer 306. The partner acquirer 306 routes the transactions to the issuer 316 and settles the transaction as usual. The account correlating device 312 is configured to log all transaction activity.

When transactions are conducted with non-partner acquirer, such as those represented by Merchant B 304, the non-partner acquirer 320 routes the transaction to a partner acquirer, such as acquirer 306. The account correlating device 312 swaps credentials as a partner acquirer and logs the transaction activity. In this case, a second hop interchange fee may apply.

Therefore, the account correlating device 312 may be configured to swap credential data, collect transaction data, and settle transactions. The account correlating device 312 may also execute user rules, require a verification that the user is present for the transaction, and may involve the consumer, the issuer 316, 322, and/or other parties in the process of identifying fraud.

FIGS. 16-20 are flow diagrams illustrating an overview of transaction flow processes. FIG. 16 may be a conventional method 330 for conducting a transaction. In this example, a cardholder 332 or user uses the proxy device 100, 104 with a merchant 334 to make a purchase. The merchant 334 obtains transaction information, such as first account information, and creates a request for authorization. The merchant 334 passes this information to an acquirer 336. The acquirer 336 then passes the request for authorization to the scheme or switch 338, which then transmits the request for authorization to an issuer 340. The issuer 340 responds to the request for authorization from the merchant 334 with an authorization response which is sent to the merchant by the reverse path.

Figure 17:
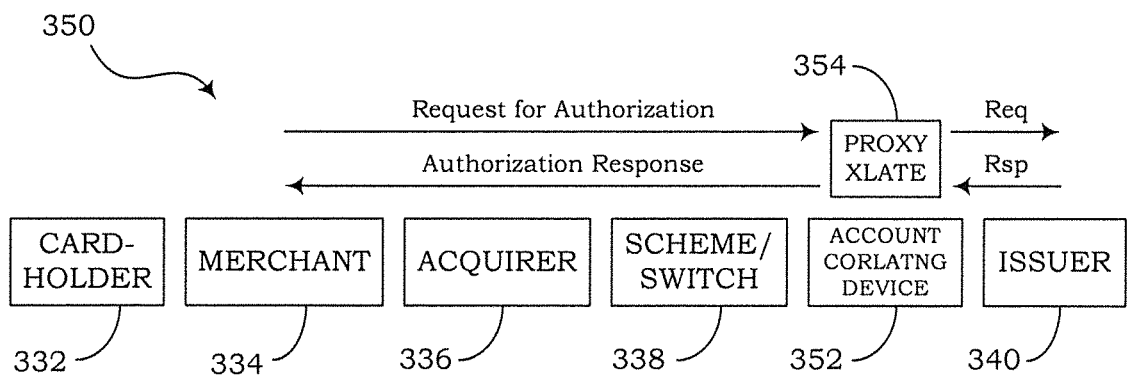

In FIG. 17, the method 330 of FIG. 16 includes an account correlating device 352, which may correspond to the account correlating device 24 shown in FIG. 1. The account correlating device 352 may include a proxy translation device 354. In this embodiment, the issuer 340 is the issuer of both the first account details and the first valid credential details. The transaction is conducted in the usual manner, as described with respect to FIG. 16, except that the scheme/switch 338 sends the request for authorization to the account correlating device 352.

The account correlating device 352 places the first request for authorization on hold. The proxy translation device 354 analyzes consumer rules to map the first account details to the substitute valid credential. The account correlating device 352 creates a second request for authorisation (which may be a new financial transaction or an API call direct to the issuer) and the account correlating device 352 sends the second request for authorisation to the issuer 340.

The issuer 340 processes the second request for authorisation and sends a response. The account correlating device 352 uses the second request for authorisation response to create a response to the first request for authorisation and sends the response to the merchant 334.

Figure 18:
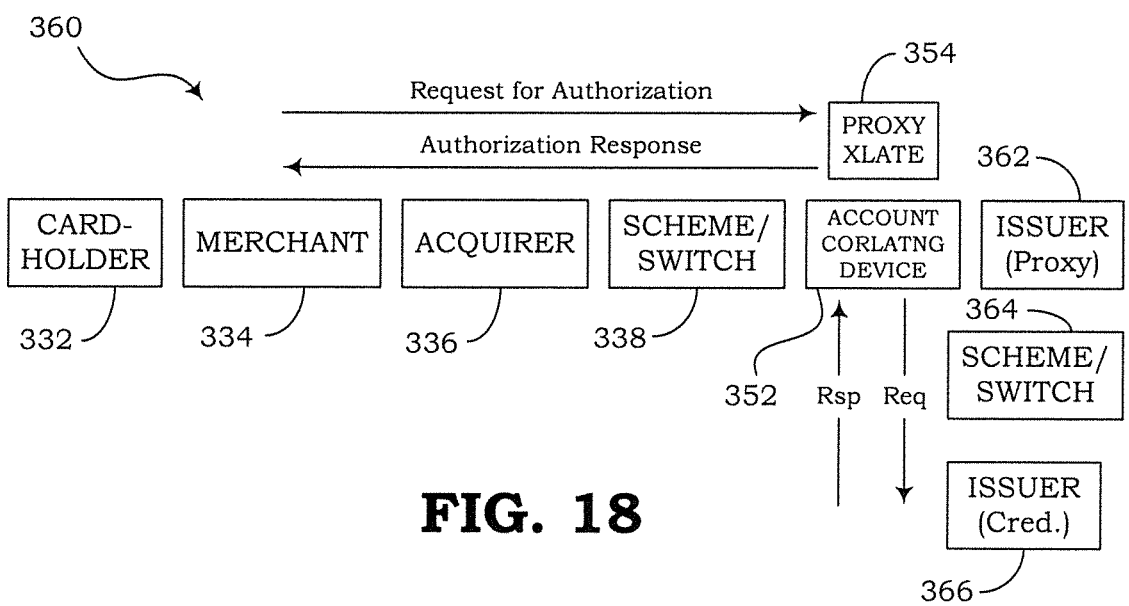

In FIG. 18 the method 360 is the same as method 350 of FIG. 18 except that in this embodiment, the issuer (proxy) 362 is the issuer of the first account details and the issuer (credential) 366 is the issuer of the first valid credential details. In method 360, the transaction flow is the same as method 350 except that the account correlating device 352 sends the second request for authorisation to scheme/switch 364 which sends the second request for authorization to the issuer (credential) 366.

The issuer (credential) 366 processes the second request for authorisation and sends a response. The account correlating device 352 uses the second request for authorisation response to create a response to the first request for authorisation and sends the response to the merchant.

Figure 19:
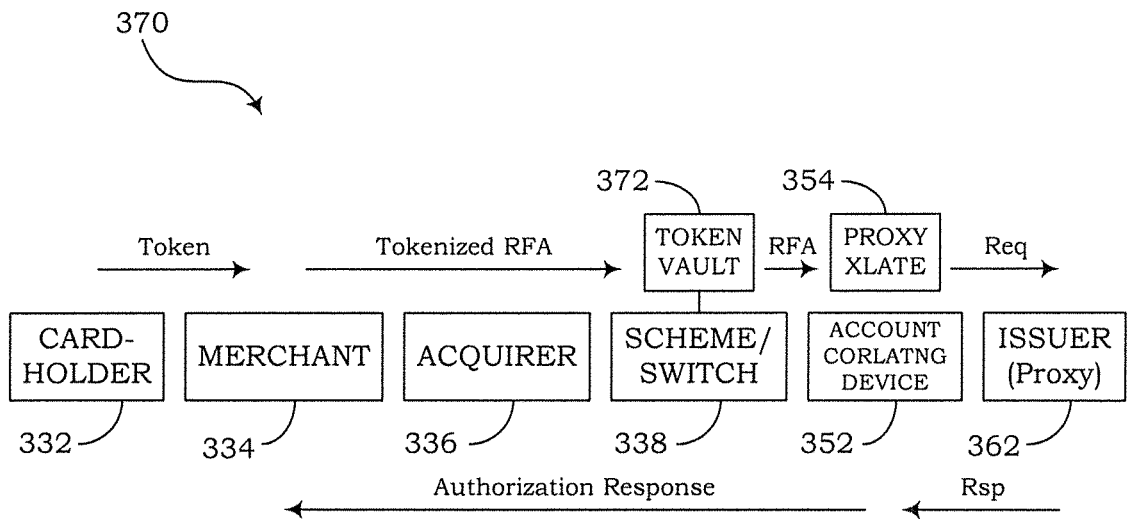

In FIG. 19 the method 370 is the same as method 350 of FIG. 17 except that in this embodiment a third party token vault 372 is included in the transaction flow. In this embodiment, the cardholder 332, may be a device on which is stored tokenized substitute first account details. The merchant creates the first request for authorization containing the tokenized substitute first account details and sends the first request for authorization to the scheme/switch in the same manner as described in method 350 of FIG. 17. However, in method 370 the scheme/switch 338 sends the tokenized substitute first account details to the third party token vault 372 which translates the token to detokenized substitute first account details and sends the detokenized substitute first account details to the scheme/switch. The scheme/switch then sends the detokenized substitute first account details to the account correlating device 352. After receiving the response the account correlating device 352 processes the response in the manner described in method 350.

Figure 20:
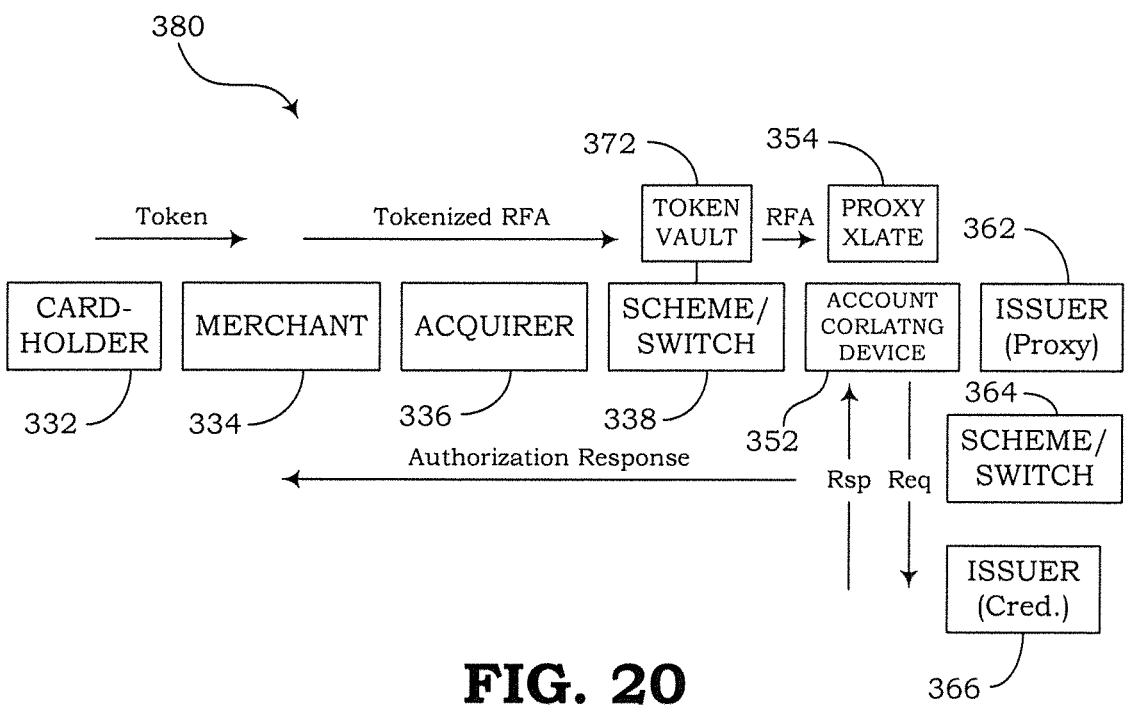

In FIG. 20 the method 380 is the same as method 370 of FIG. 20 except that in this embodiment, the issuer (proxy) 362 is the issuer of the first account details and the issuer (credential) 366 is the issuer of the first valid credential details. In method 380, the transaction flow is the same as method 370 except that the account correlating device 352 sends the second request for authorisation to scheme/switch 364 which sends the second request for authorization to the issuer (credential) 366. The issuer (credential) 366 processes the second request for authorisation and sends a response. The account correlating device 352 uses the second request for authorisation response to create a response to the first request for authorisation and sends the response to the merchant in the manner described in method 370.

The implementations described herein represent a number of possible implementations and examples and are not intended to necessarily limit the present disclosure to any specific implementations. Instead, various modifications can be made to these implementations as would be understood by one of ordinary skill in the art. Any such modifications are intended to be included within the spirit and scope of the present disclosure.

The invention claimed is:

1. A system for processing financial transaction messages, comprising:
- a user device storing a proxy credential of a user;
- a point of sale device configured to receive, as part of a financial transaction, the proxy credential from the user device, and to send an encrypted POS device transaction message, including the proxy credential, to a merchant acquirer;
- a merchant acquirer configured receive, decrypt, and re-encrypt the encrypted POS device transaction message to create an encrypted original transaction message including the proxy credential and to send the encrypted original transaction message to a payment switch;
- the payment switch configured to receive the encrypted original transaction message from the merchant acquirer and to send the encrypted original transaction message to a proxy issuer processor of the issuer of the proxy credential;
- the proxy issuer processor configured to receive the encrypted original transaction message from the payment switch send the proxy credential to an account correlating device,
- the account correlating device configured to receive the encrypted original transaction message from the proxy issuer processor, to decrypt the encrypted original transaction message and to create an edited original transaction message that includes tokenized information including the user's actual valid credential corresponding to the proxy credential, and to re-encrypt the edited original transaction message; and an issuer processor of the issuer of the user's actual valid credential configured to receive the re-encrypted edited transaction message from the account correlating device and, based at least in part of the contents of the re-encrypted edited transaction message, to send a response message indicating whether the financial transaction should be accepted or denied;

wherein the account correlating device is further configured to create an edited response message created from the response message by reversing the mapping from the proxy credential to the user's actual valid credential, and to communicate the edited response message to the merchant acquirer.

2. The system of claim 1, wherein the account correlating device is configured to create the edited original transaction message using a customizable rules engine.

3. The system of claim 1, further comprising:
a transaction vault, configured to:
  decrypt and tokenize the encrypted original transaction message to create a tokenized message; and
  transmit the tokenized message.

4. The system of claim 1, further comprising: a transaction guardian configured to receive, requested transaction edits and a token of a selected valid credential.

5. The system of claim 4, wherein the transaction guardian is further configured to validate an original transaction of the encrypted original transaction message and the requested transaction edits.

6. The system of claim 1, wherein a user uses the POS device to conduct a transaction with a proxy card.

7. The system of claim 1, wherein a user uses the POS device to conduct a transaction with a mobile proxy device.

8. A method of processing financial transaction messages, comprising:
receiving, by a payment switch, an encrypted original transaction message from a merchant acquirer, the encrypted original transaction message including a proxy credential of a user read from a user device by a merchant terminal as part of a financial transaction;
sending by the payment switch, the encrypted original transaction message to an issuer processor of the issuer of the proxy credential;
receiving by an account correlating device the encrypted original transaction message from the issuer processor of the issuer of the proxy credential;
decrypting by the account correlating device, the encrypted original transaction message and creating an edited transaction message that includes the user's actual valid credentials-corresponding to the proxy credentials;
re-encrypting, by the account correlating device the edited transaction message;
sending the re-encrypted edited transaction message to the payment switch; and
sending, by the account correlating device, the re-encrypted edited transaction message to an issuer processor of an issuer of the user's actual valid credential;

receiving, by the account correlating device from the issuer processor of the issuer of the user's actual valid credential, a response message, based at least in part on the contents of the edited transaction message, indicating the financial transaction should be confirmed or denied; and producing an edited response message by reversing a mapping of the proxy credential to user's actual valid credential in the response message before sending the edited response message back to the merchant acquirer.

9. The method of claim 8, further comprising:
receiving, by a point-of-sale (POS) device, a user's proxy credential from a user proxy device;
sending, by the POS device an encrypted POS device transaction message including the user's proxy credential to the merchant acquirer.

10. The method of claim 9, further comprising:
receiving, decrypting, and re-encrypting, by the merchant acquirer, the encrypted POS device transaction message to create the encrypted original transaction message; and
transmitting, by the merchant acquirer, the encrypted original transaction message to the payment switch.

11. The method of claim 8, further comprising:
forwarding, by the issuer processor of the issuer of the proxy credential, the encrypted original transaction message to a transaction vault;
decrypting and tokenizing, by the transaction vault, the encrypted original transaction message to create a tokenized message including the user's actual credential corresponding to the proxy credential; and
transmitting, by the transaction vault, the tokenized message.

12. The method of claim 8, further comprising:
receiving, at a transaction guardian, requested transaction edits and a token of a selected valid credential from the issuer processor of the issuer of the proxy credential.

13. The method of claim 12, further comprising:
validating, by the transaction guardian, an original transaction of the encrypted original transaction message and the requested transaction edits.

14. The system of claim 1, wherein the account correlating device is configured to map the proxy credential to the user's actual valid credential based on configurable rules selected by the user or an issuing institution of the proxy credential.

15. The system of claim 14, wherein the configurable rules are dependent on a calculated location of the user.

16. The system of claim 14, wherein the configurable rules are dependent on the presence of a user's mobile device.

17. The system of claim 14, wherein the configurable rules are dependent on a value of the transaction.

* * * * *